United States Patent
Kuwahara

(10) Patent No.: US 6,948,597 B2
(45) Date of Patent: Sep. 27, 2005

(54) EDDY CURRENT DECELERATION DEVICE

(75) Inventor: Tohru Kuwahara, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/445,529

(22) Filed: May 27, 2003

(65) Prior Publication Data

US 2003/0221920 A1 Dec. 4, 2003

(30) Foreign Application Priority Data

May 28, 2002 (JP) ........................................ 2002-154349
Jun. 27, 2002 (JP) ........................................ 2002-187293

(51) Int. Cl.⁷ .............................................. B60L 7/00
(52) U.S. Cl. ...................... 188/164; 188/158; 188/161; 188/267; 310/93; 310/105
(58) Field of Search ................................ 188/158, 164, 188/267, 161; 310/77, 92, 93, 105–110, 156; 335/306

(56) References Cited

U.S. PATENT DOCUMENTS

| 3,206,655 | A | | 9/1965 | Relinst | 317/159 |
| 3,488,353 | A | | 1/1970 | Baermann | 310/93 |
| 5,023,499 | A | * | 6/1991 | Kuwahara | 310/105 |
| 5,215,169 | A | * | 6/1993 | Kuwahara | 188/164 |
| 5,303,802 | A | * | 4/1994 | Kuwahara | 188/158 |
| 6,176,355 | B1 | * | 1/2001 | Yamamoto | 188/267 |
| 6,237,728 | B1 | * | 5/2001 | Kobayashi et al. | 188/158 |
| 6,328,142 | B1 | * | 12/2001 | Kuwahara | 188/158 |
| 6,392,324 | B1 | * | 5/2002 | Kuwahara | 310/156.11 |

FOREIGN PATENT DOCUMENTS

| CH | 497 813 | 11/1970 |
| EP | 0 456 017 A2 | 11/1991 |
| EP | 1 193 724 A2 | 4/2002 |
| JP | 01-298498 | 12/1989 |
| JP | 04-012659 | 1/1992 |
| JP | 04-088866 | 3/1992 |
| JP | 04-088867 | 3/1992 |
| JP | 2000-350432 | 12/2000 |
| JP | 2001-008436 | 1/2001 |
| JP | 2001-327154 | 11/2001 |

* cited by examiner

Primary Examiner—Matthew C. Graham
Assistant Examiner—Mariano Sy
(74) Attorney, Agent, or Firm—McCormick, Paulding & Huber LLP

(57) ABSTRACT

An eddy current deceleration device includes a rotor mounted on a rotary shaft; a first magnet ring arranged facing this rotor and including permanent magnets that are arranged at prescribed intervals in the circumferential direction and such that the poles thereof facing each other in the circumferential direction are of a same polarity, and magnetic members interposed between these permanent magnets; and a second magnet ring arranged between this first magnet ring and the rotor and including permanent magnets and magnetic members which are similar to those of the first magnet ring; at least one of the first and second magnet rings being freely rotatable. The permanent magnets of the first and second magnet rings can be magnetized separately between the first and second magnet rings.

5 Claims, 42 Drawing Sheets

EDDY CURRENT DECELERATION DEVICE

REFERENCE TO RELATED APPLICATION

The present invention claims priority from Japanese Patent Application 2002-154349 filed in Japan on 28th May 2002 and Japanese Patent Application No. 2002-187293 filed in Japan on 27th Jun. 2002. The content of these Japanese applications is hereby incorporated in the specification of the present application by reference.

BACKGROUND OF THE INVENTION

1. Field of the Invention

The present invention relates to an eddy current deceleration device that applies deceleration braking to a vehicle.

2. Description of the Related Art

The present inventor has previously developed an eddy current deceleration device as shown in FIG. 34 to FIG. 36. As shown in these Figures, this eddy current deceleration device a comprises a drum-shaped rotor c that is mounted on a power transmission system such as a drive shaft b of a vehicle and a stator d (source of magnetic force) mounted on a fixed system such as a vehicle transmission. The vehicle is decelerated and braked by generating eddy currents in the rotor c by supplying magnetism from the stator d to the rotor c. The deceleration braking is released by shielding the magnetism within the stator d.

The stator d comprises a hollow ring-shaped casing e that is supported on a fixed system, a magnetic ring g that is freely rotatably accommodated, by means of a bush f, in the interior of the casing e and an actuator (cylinder h or the like) that rotates the magnetic ring g. As shown in FIG. 35 and FIG. 36, the magnetic ring g comprises a support ring i made of a non-magnetic body, a plurality of permanent magnets j mounted with a prescribed spacing in the circumferential direction on the support ring i and magnetic members k interposed between each of the permanent magnets j. These permanent magnets j have magnetic pole faces at the respective opposite end faces in the circumferential direction and are arranged such that facing poles thereof in the circumferential direction are of the same polarity. In addition, on the casing e, there are alternately arranged along the circumferential direction pole pieces 1 made of magnetic material (soft magnetic material) positioned in a region between the magnetic ring g and the rotor c and supports m made of non-magnetic material that support these pole pieces. As shown in FIG. 36, the circumferential length of the pole pieces 1 matches the circumferential length of the magnetic members k.

With this construction, as shown in FIG. 35, when the permanent magnets j are positioned below the pole pieces 1 by rotating the magnetic ring g with the cylinder h, the magnetism of the permanent magnets j is shielded by the pole pieces 1, constituting a short-circuit n, so no eddy current is generated in the rotor c and no deceleration braking is produced in the vehicle. In contrast, as shown in FIG. 36, when the magnetic members k are positioned below the pole pieces 1, a magnetic circuit o linking the N pole and S pole is constituted between the permanent magnet j and the rotor c, so eddy current is generated in the rotor c, producing deceleration braking of the vehicle.

In order to increase the braking force in such an eddy current deceleration device a, it is important to intensify the magnetic force of the permanent magnets j of the magnetic ring g. However, as shown in FIG. 35 and FIG. 36, if the permanent magnets j are arranged with facing magnetic poles in the circumferential direction thereof being of the same polarity, when the permanent magnets j are magnetized after assembly of the permanent magnets j and magnetic members k in ring fashion, sufficient magnetization of the permanent magnets j cannot be achieved unless the circumferential length of the pole pieces k interposed between these permanent magnets j is expanded to a certain extent. Consequently, if magnetization of the permanent magnets j is prioritized, the gaps between the permanent magnets j have to be widened to a certain extent, thereby restricting the number of permanent magnets j that can be provided. On the other hand, if the number of permanent magnets j that are to be provided is prioritized, magnetization becomes insufficient because the gap therebetween is reduced. It was therefore difficult to increase the braking force.

Also, as shown in FIG. 35, although, when the deceleration braking is turned off, a dominant part of the magnetism of the permanent magnets j is shielded within the casing e by the pole pieces 1, some portion thereof leaks to the rotor c through the supports m made of non-magnetic material, thereby constituting a magnetic leakage circuit p. Weak eddy currents are thereby generated in the rotor c, giving rise to dragging braking, which has an adverse effect on fuel consumption of the vehicle.

Related prior art is disclosed in for example Japanese Patent Publication Nos. H. 6-83570, H. 6-83571, and H. 7-118901, and Japanese Laid-open Patent Application Nos. 2000-350432 and 2001-8436.

An object of the present invention, which was created in view of the above, is to provide an eddy current deceleration device wherein braking force can be increased and dragging braking prevented.

SUMMARY OF THE INVENTION

The invention according to claim 1 of the present application consists in an eddy current deceleration device comprising: a rotor mounted on a rotary shaft; a first magnet ring arranged facing this rotor and comprising a plurality of permanent magnets that are arranged with a prescribed spacing in the circumferential direction and such that the poles thereof facing in the circumferential direction are of a same polarity, and magnetic members interposed between these permanent magnets; and a second magnet ring arranged between this first magnet ring and the rotor and comprising permanent magnets and magnetic members similar to those of the first magnet ring; at least one of the first and second magnet rings being freely rotatable.

According to the present invention, when at least one of the first and second magnet rings is rotated, putting these magnet rings in a phase in which the permanent magnets of the first magnet ring and the permanent magnets of the second magnet ring are arranged with their identical polarity poles, a magnetic circuit is constituted by the permanent magnets and the rotor, causing eddy currents to be generated in the rotor and thereby producing deceleration braking of the vehicle. Contrariwise, when these rings are put in a phase in which the permanent magnets of the first magnet ring and the permanent magnets of the second magnet ring are arranged with their opposite polarity poles, a screening magnetic circuit is constituted whereby the permanent magnets of the first magnet ring and the permanent magnets of the second magnet ring are mutually magnetically short-circuited, with the result that no eddy currents are generated in the rotor and deceleration braking is released.

Also, during braking, the respective permanent magnets of the first and second magnet rings are in a condition in which two permanent magnets are adjacent with the same polarity, so these permanent magnets constitute sets of pairs, which exhibit strong magnetic force. Also, the respective permanent magnets of the first and second magnet rings can be separately magnetized in the first magnet ring and the second magnet ring. When this is done, as already described, magnetization of the permanent magnets is achieved with these being of a length that is half the length of the sets of pairs, so the intervals between adjacent permanent magnets in the circumferential direction can be made small yet ample magnetization can still be achieved. Braking force is thereby improved.

The invention according to claim 2 consists in an eddy current deceleration device comprising: a rotor mounted on a rotary shaft; a magnet ring arranged facing this rotor and comprising a plurality of permanent magnets that are arranged at a prescribed pitch in the circumferential direction and such that the polarities of their poles facing the rotor are alternately inverted, and magnetic members for connecting the magnetic poles, of these permanent magnets, that face the opposite side of the rotor; and a magnetic ring arranged between this magnet ring and the rotor and comprising a plurality of permanent magnets that are arranged at a prescribed pitch in the circumferential direction and such that the poles thereof facing in the circumferential direction are of a same polarity, and magnetic members that hold these permanent magnets; at least one of the magnet ring and magnetic ring being freely rotatable.

According to the present invention, by rotating at least one of the magnet ring and magnetic ring so as to put these rings in a phase such that permanent magnets, of the permanent magnets of the magnet ring, that are of the same polarity as the permanent magnets sandwiching the magnetic members, face the magnetic members between the permanent magnets of the magnetic ring, the magnetism that is generated from the permanent magnets of the magnetic ring and the magnet ring can be respectively transmitted to the rotor, making it possible to perform strong deceleration braking of the rotary shaft with a high magnetic flux density.

Contrariwise, by putting these rings in a phase in which permanent magnets, of the permanent magnets of the magnet ring, that are of unsame polarity to the permanent magnets that sandwich the magnetic members face the magnetic members between the permanent magnets of the magnetic ring, the permanent magnets of the magnet ring and the magnetic ring can be mutually magnetically short-circuited, thereby making it possible to prevent magnetic leakage to the rotor and so prevent dragging torque from being generated.

The invention according to claim 3 consists in an eddy current deceleration device wherein the rotor comprises a drum body fixed to the rotary shaft.

The invention according to claim 4 consists in an eddy current deceleration device wherein the rotor comprises a disk body fixed to the rotary shaft.

The invention according to claim 5 comprises an actuator that rotates at least one of the magnet ring and magnetic ring and that sets the relative position of the magnet ring and magnetic ring in one of a braking position, in which permanent magnets of the permanent magnets of the magnet ring that are of the same polarity as the permanent magnets sandwiching the magnetic members are directed towards magnetic members between the permanent magnets of the magnetic ring, and a non-braking position in which the magnet ring and the magnetic ring are offset by a prescribed rotational width exceeding ½ pitch but less than 1 pitch in the circumferential direction from this braking position.

According to the present invention, the permanent magnets of the magnetic ring can be made smaller and of weaker magnetic force than the permanent magnets of the magnet ring, so the thickness of the magnetic ring in the radial direction can be reduced.

According to the invention of claim 6, the non-braking position is set in a position offset by substantially ⅔ pitch in the circumferential direction from the braking position.

According to the invention of claim 7, the magnetic ring comprises a plurality of magnetic blocks formed in arcuate shape and connecting elements that connect the ends in the circumferential direction of these magnetic blocks, while holding the permanent magnets.

According to the invention of claim 8, a magnetic member of the magnetic ring is formed in annular shape and is provided with embedding holes so that the permanent magnets are embedded and fixed in these holes.

DESCRIPTION OF THE PREFERRED EMBODIMENTS

An embodiment of the present invention according to claim 1 is described with reference to the appended drawings.

Figure 1:
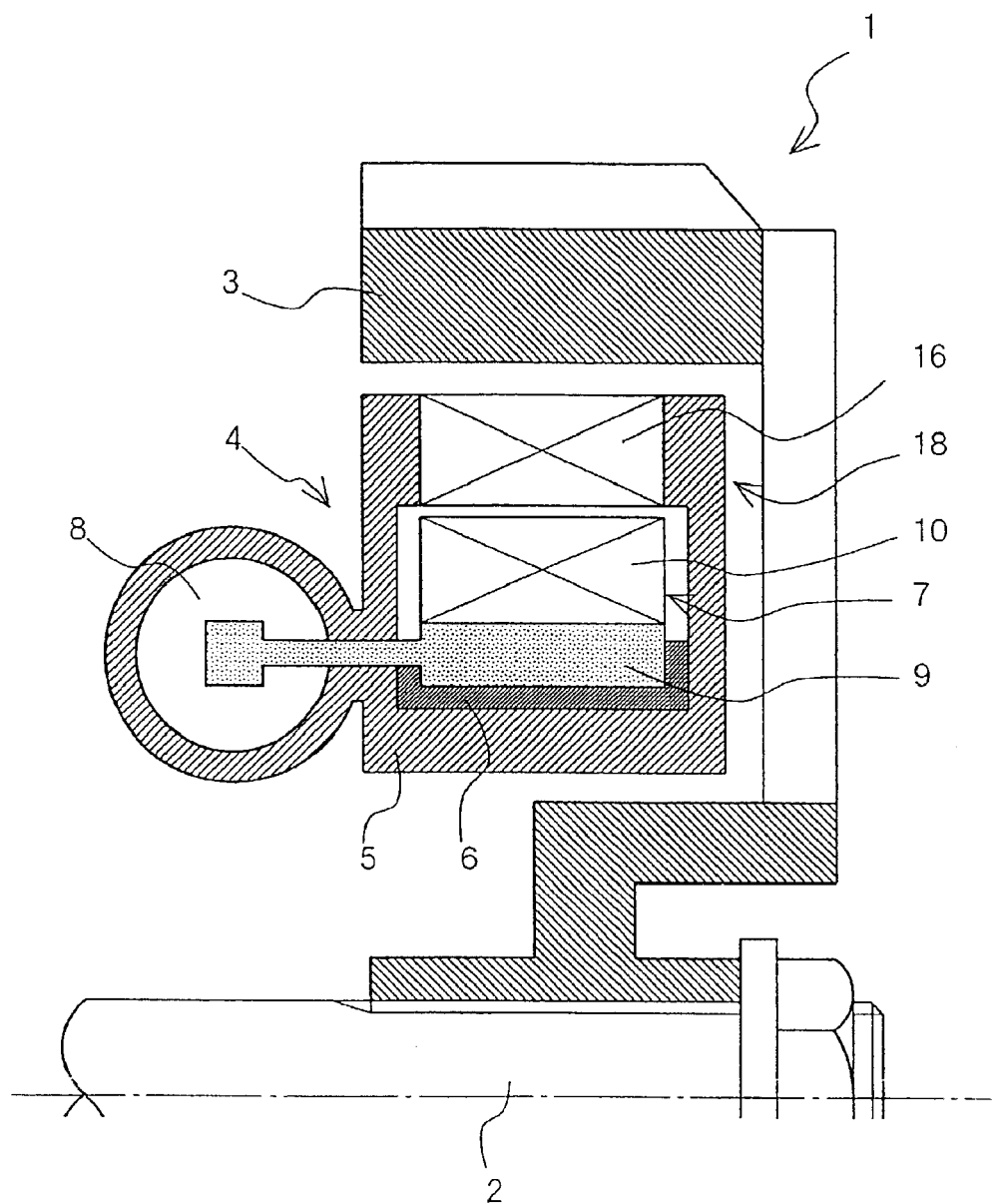
FIG. 1 is a side cross-sectional view of an eddy current deceleration device according to an embodiment of the invention according to claim 1.
Figure 2:
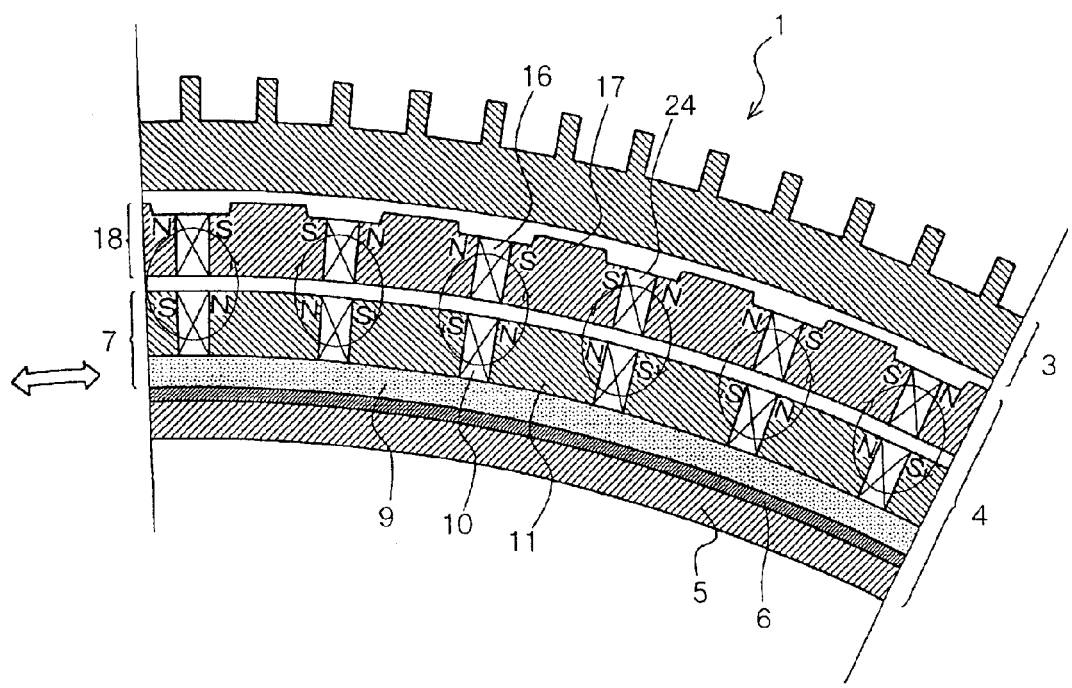
FIG. 2 is a front cross-sectional view of the brake-OFF condition of the above device.
Figure 3:
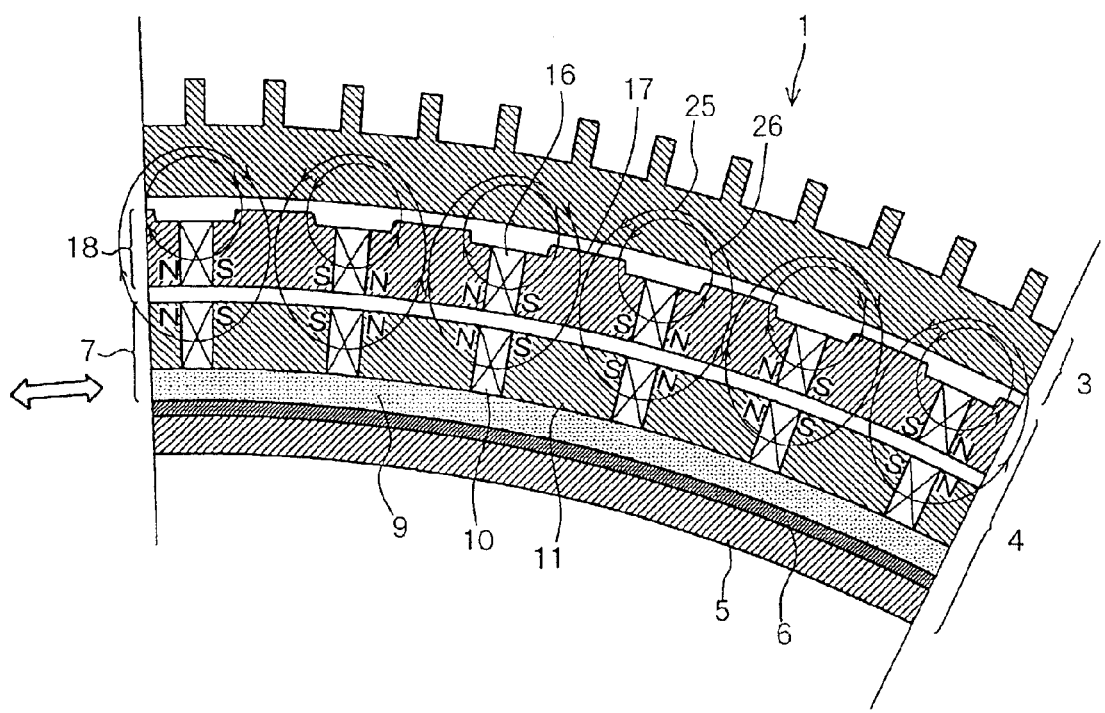
FIG. 3 is a front cross-sectional view of the brake-ON condition of the above device.

FIG. 1 shows a side cross-sectional view of an eddy current deceleration device according to an embodiment of the invention. FIG. 2 shows a front cross-sectional view of the brake-OFF condition of this device. FIG. 3 shows a front cross-sectional view of the brake-ON condition of this device.

As shown in FIG. 1, this eddy current deceleration device 1 comprises a drum-shaped rotor 3 that is mounted on a rotary shaft 2 of the power transmission system of a vehicle and a stator 4 (source of magnetic force) mounted on a fixed system such as the vehicle transmission. This eddy current deceleration device is capable of deceleration braking of the vehicle by generating eddy currents in the rotor 3 by supplying magnetism to the rotor 3 from the stator 4 and of releasing the deceleration braking by shielding the magnetism within the stator 4.

The stator 4 comprises a hollow ring-shaped casing 5 supported by the fixed system, a first magnet ring 7 freely rotatably accommodated by means of a bush 6 in the interior of the casing 5 and an actuator (fluid cylinder 8 or the like) that rotates the first magnet ring 7. As shown in FIG. 2 and FIG. 3, the first magnet ring 7 comprises a support ring 9 made of a non-magnetic body (such as austenitic stainless steel), a plurality of permanent magnets 10 mounted with a prescribed spacing in the circumferential direction of the support ring 9 and magnetic members 11 (for example laminated bodies made of electromagnetic steel sheet or block members made of iron) interposed between these permanent magnets 10. The permanent magnets 10 are provided with magnetic pole faces at opposite end faces in the circumferential direction, and the facing poles thereof in the circumferential direction have the same polarity.

Figure 6:
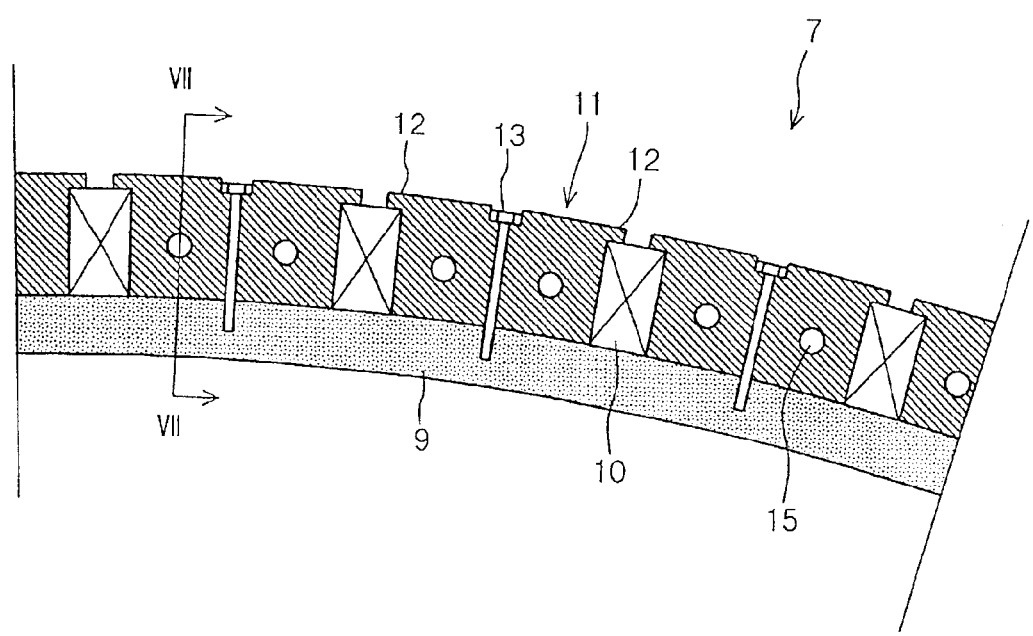
FIG. 6 is a front cross-sectional view of a first magnetic ring of the above device.
Figure 7:
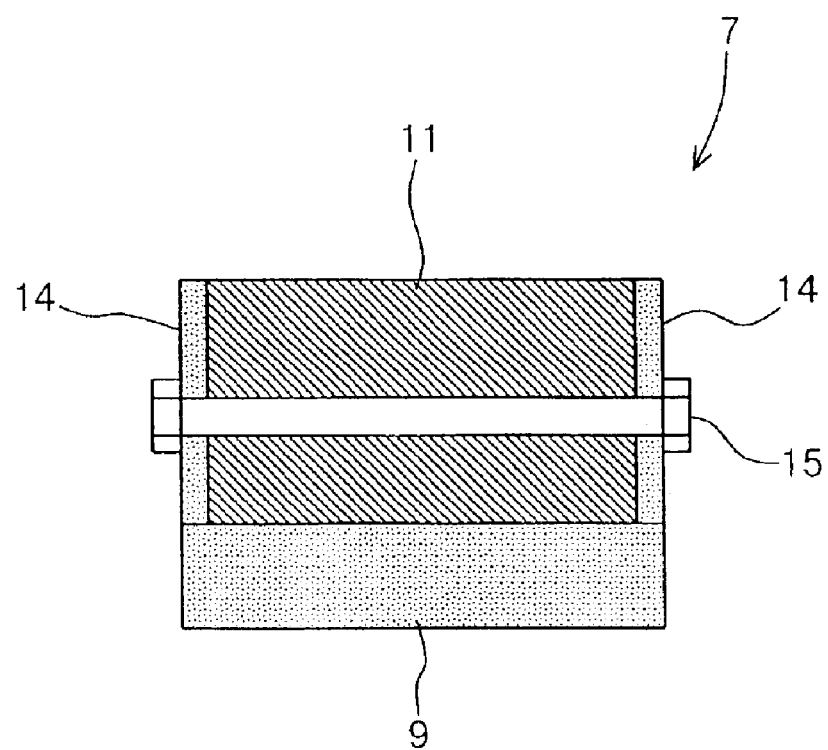
FIG. 7 is a cross-sectional view along the line VII—VII of FIG. 4.

As shown in FIG. 6 and FIG. 7, the first magnet ring 7 is constituted for example by fixing a block-shaped magnetic member 11 having claws 12 at the opposite ends thereof in the circumferential direction on the outer circumferential side on the outer circumferential surface of a support ring 9 made of a non-magnetic body by means of bolts, screws or other fixing elements 13, such that the permanent magnets 10 are secured in position by the aforementioned claws 12 between the magnetic members 11. In addition, rigidity may be increased by attaching connecting plates 14 formed in sector shape or ring shape along the circumferential direction on both sides of the magnetic members 11 by means of bolts, screws or other fixing elements 15. The connecting plates 14 are made of non-magnetic bodies in order not to magnetically short-circuit the adjacent permanent magnets 10.

As shown in FIG. 1 to FIG. 3, a second magnet ring 18 comprising permanent magnets 16 and magnetic members 17 similar to the first magnetic ring 7 is integrally provided, positioned in a region between the first magnet ring 7 and the rotor 3 in the casing 5. Specifically, the second magnet ring 18 comprises a plurality of permanent magnets 16 mounted with a prescribed spacing in the circumferential direction and arranged with facing magnetic poles thereof in the circumferential direction being of the same polarity, and magnetic members 17 (for example consisting of a laminated body of electromagnetic sheet steel or a block member made of iron) interposed between the permanent magnets 16. The pitch and circumferential length of the permanent magnets 10, 16 and magnetic members 11, 17 of the internal and external magnet rings 7, 18 are set to be substantially equal on the inside and the outside. The magnetic members 11, 17 constitute respective pole pieces of the inner and outer permanent magnets 10, 16.

Figure 4:
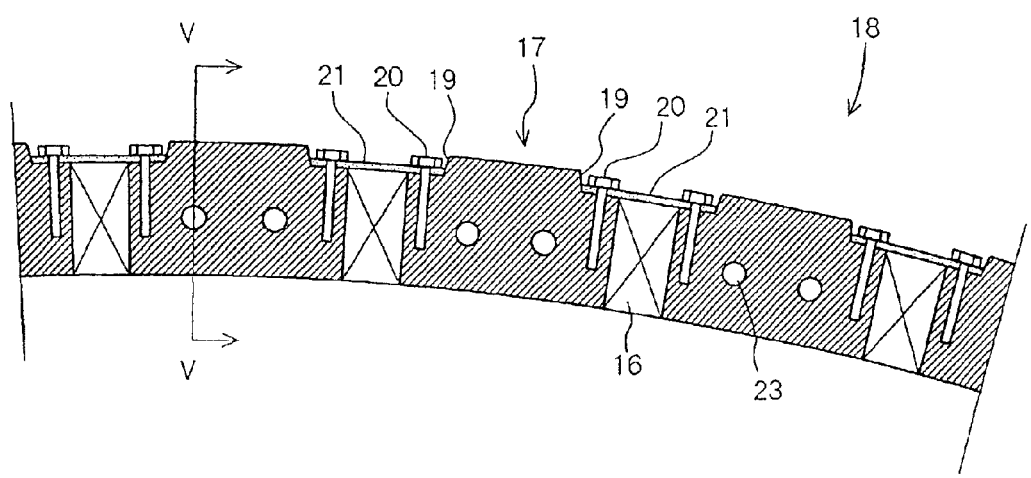
FIG. 4 is a front cross-sectional view of a second magnetic ring of the above device.
Figure 5:
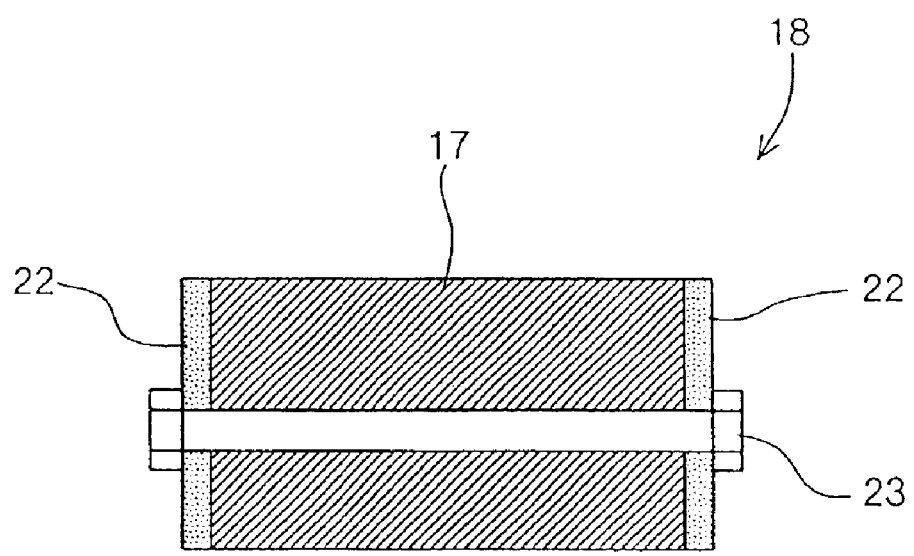
FIG. 5 is a cross-sectional view along the line V—V of FIG. 4.

The second magnet ring 18, for example as shown in FIG. 4 and FIG. 5, is constituted in ring shape by connecting block-shaped magnetic members or laminated bodies 17 made of electromagnetic sheet steel having recesses 19 at the opposite ends thereof in the circumferential direction on the outer circumferential side by means of connecting elements 21 that are fixed by means of bolts, screws or other fixing elements 20 in the recesses 19, on both sides of the permanent magnets 16. In addition, rigidity may be increased by attaching connecting plates 22 formed in sector shape or ring shape along the circumferential direction on both sides of the magnetic members 17 by means of bolts, screws or other fixing elements 23. These connecting plates 22 and connecting elements 21 are made of non-magnetic bodies in order not to magnetically short-circuit the adjacent permanent magnets 16. The connecting elements 21 could also be made of soft magnetic material (iron material) in order to prevent magnetic leakage to the rotor 3.

The operation of this embodiment will now be described.

When deceleration braking of this eddy current deceleration device is turned off, as shown in FIG. 2, the permanent magnets 10 of the first magnet ring 7 and the permanent magnets 16 of the second magnet ring 18 are put in a phase where opposite polarity poles are adjacent to each other by rotating the first magnet ring 7 using the cylinder 8. When this is done, a shielding magnetic circuit 24 is constituted by mutual magnetic short-circuiting of the permanent magnets 10 of the first magnet ring 7 and the permanent magnets 16 of the second magnet ring 18. Eddy currents are therefore not generated in the rotor 3, so deceleration braking does not occur. That is, in this condition, the magnetic members 11 of the first magnet ring 7 and the magnetic members 17 of the second magnet ring 18 opposite this first magnet ring constitute pole pieces of mutually opposite polarities (N pole or S pole), so the permanent magnets 10, 16 are mutually magnetically short-circuited through the pole pieces 11, 17.

In contrast, when deceleration braking is turned on, as shown in FIG. 3, the permanent magnets 10 of the first magnet ring 7 and the permanent magnets 16 of the second magnet ring 18 are put in a phase where identical polarity poles are adjacent to each other, by rotating the first magnet ring 7. When this is done, magnetic circuits 25, 26 are constituted by the permanent magnets 10 and 16 in the first and second magnet rings 7 and 18 and the rotor 3. Eddy currents are therefore generated in the rotor 3, causing deceleration braking of the vehicle. Specifically, the magnetic member 11 of the first magnet ring 7 and the magnetic member 17 of the second magnet ring 18 facing this first magnet ring then constitute pole pieces of same polarity (N pole/N pole or S pole/S pole), so these permanent magnets 10, 16 are respectively magnetically connected through the rotor 3, without mutual magnetic short-circuiting through the pole pieces 11, 17.

Furthermore, during deceleration braking as illustrated in FIG. 3, since the respective permanent magnets 10, 16 of the first and second magnet rings 7, 18 are arranged in pairs in the radial direction with their pole surfaces in the circumferential direction being of identical polarity, each pair of permanent magnets provides intense magnetic force. Strong braking force is thereby obtained by a magnetic force from permanent magnets 10, 16 of substantially double length. Also, the permanent magnets 10, 16 of the first magnet ring 7 and second magnet ring 18 can be magnetized separately between the first and second magnet rings 7 and 18. When this separate magnetization is performed, half the length of the magnet pair described above is magnetized, and, consequently, even if the distance between adjacent permanent magnets 10 and 10 or 16 and 16 in the circumferential direction is reduced, ample magnetization can still be achieved after assembly into the form of a ring. Braking force is therefore improved.

Specifically, with this embodiment, since the respective permanent magnets 10, 16 of the first and second magnet rings 7 and 18 are of length half the length of the magnet pair which is constituted by arranging two such magnets are arranged to exhibit braking force, even if the spacing of the magnets 10, 16 in the circumferential direction is set to be small, ample magnetization can be achieved through the respective pole pieces 11, 17 after assembly in ring form. Furthermore, during braking, braking force is increased, since sets of pairs of inner and outer permanent magnets 10 and 16 are constituted, functioning as permanent magnets of substantially double length.

The reason why, in FIG. 2, the magnetic members 17 of the second magnet ring 18 project towards the rotor 3 and a portion of the permanent magnets 16 is recessed is in order to reduce magnetic leakage to the rotor 3 by projection of the magnetic members 17 and in order to reduce the influence on the permanent magnets 16 of the heat of the rotor 3 generated by the eddy currents, by recessing a portion of the permanent magnets 16.

Next, an embodiment of the invention to according to claim 2 will be described with reference to FIG. 8 and FIG. 9.

Figure 8:
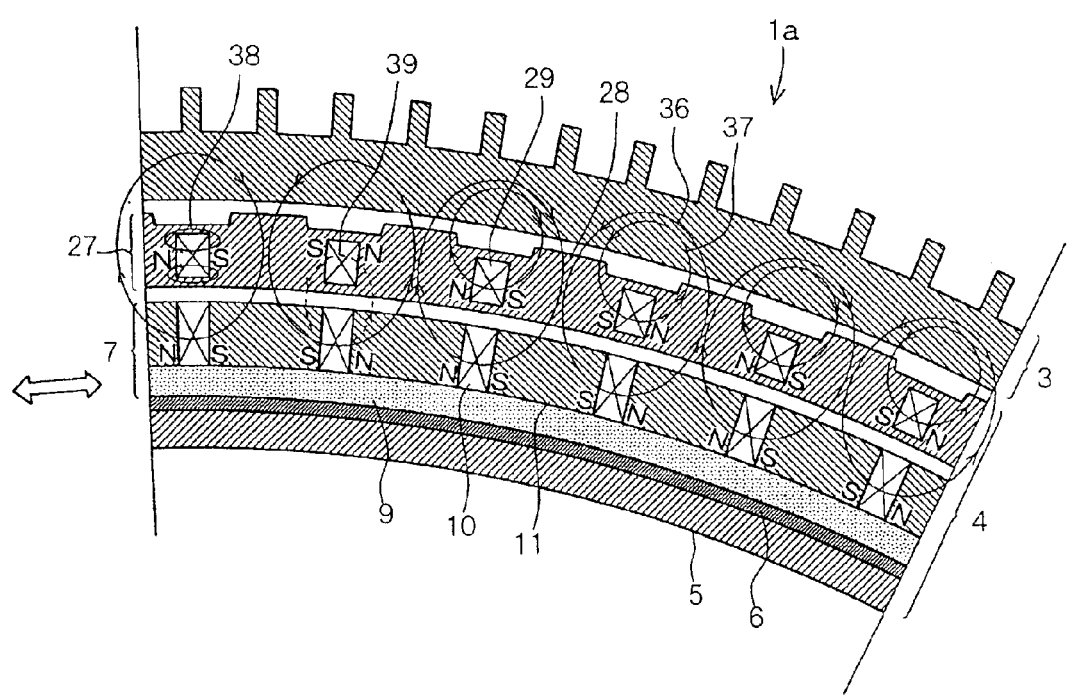
FIG. 8 is a front cross-sectional view of an eddy current deceleration device (brake-ON condition) according to an embodiment of the invention according to claim 2.

FIG. 8 shows a front cross-sectional view of the brake-ON condition of an eddy current deceleration device according to an embodiment of the invention. FIG. 9 shows a front cross-sectional view of the brake-OFF condition of this device.

As shown in these Figures, an eddy current deceleration device 1a according to this embodiment is of substantially the same construction as an eddy current deceleration device 1 according to the previous embodiment, differing only in that a magnetic ring 27 is provided in place of the aforementioned second magnet ring 18 in the casing 5 of the stator 4. Identical components are therefore given the same reference symbols and further description thereof is omitted, only the aspects that are different being described. Also, the first magnet ring 7 of the previous embodiment is referred to in this embodiment simply as magnet ring 7.

The magnetic ring 27 is provided in the casing 5 positioned in a region between the magnet ring 7 and the rotor 3. The magnetic ring 27 comprises an annular body 28 made of a magnetic body (soft magnetic member such as an iron block or laminated electromagnetic steel sheet) and a plurality of permanent magnets 29 embedded with a prescribed spacing in the circumferential direction in the interior of the annular body 28. The permanent magnets 29 are provided with pole faces at both end faces thereof in the circumferential direction and are arranged so that facing poles in the circumferential direction are of same polarity.

Figure 10A:
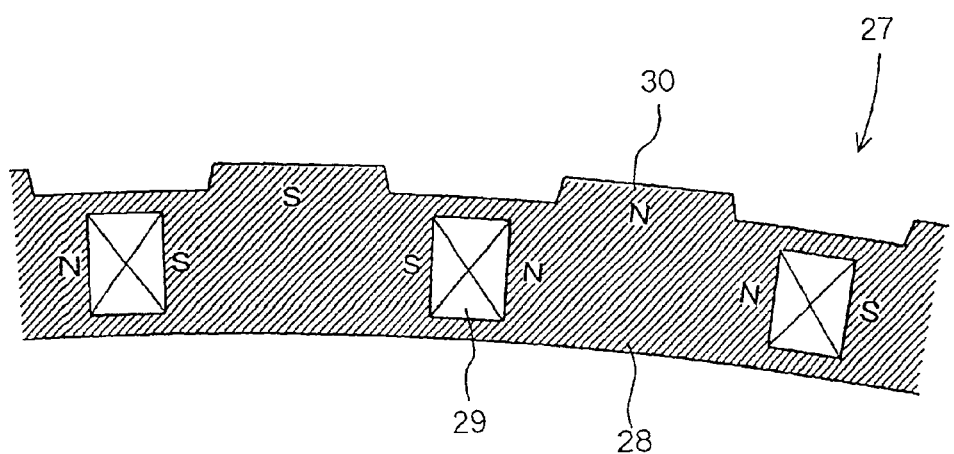
FIG. 10(a) is a front cross-sectional view showing a modified example of a magnetic ring of the above device.
Figure 10B:
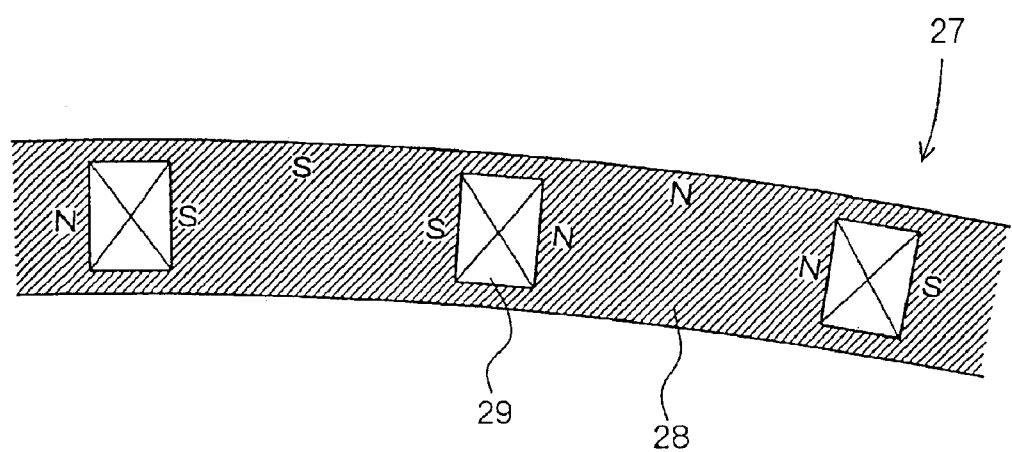
FIG. 10(b) is a front cross-sectional view showing a modified example of the above magnetic ring.
Figure 10C:
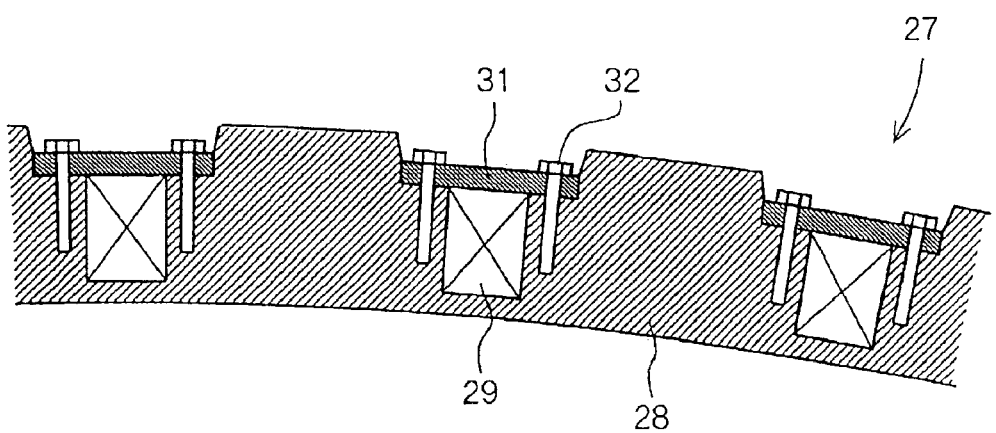
FIG. 10(c) is a front cross-sectional view showing a modified example of the above magnetic ring.

In the magnetic ring 27, as shown in FIG. 10(*a*), a raised portion 30 may be formed between the permanent magnets 29, or, as shown in FIG. 10(*b*), the raised portion 30 may be absent. Also, as shown in FIG. 10(*c*), the permanent magnets 29 may be fitted into recessed portions formed in the annular body 28 made of a magnetic body and metal elements 31 made of a magnetic member (soft magnetic body such as electromagnetic steel sheet) may be fixed and mounted in the annular body 28 by means of bolts, screws or other fixing elements 32. Non-magnetic material (stainless steel or the like) may be employed for the metal elements 31.

Figure 11D:
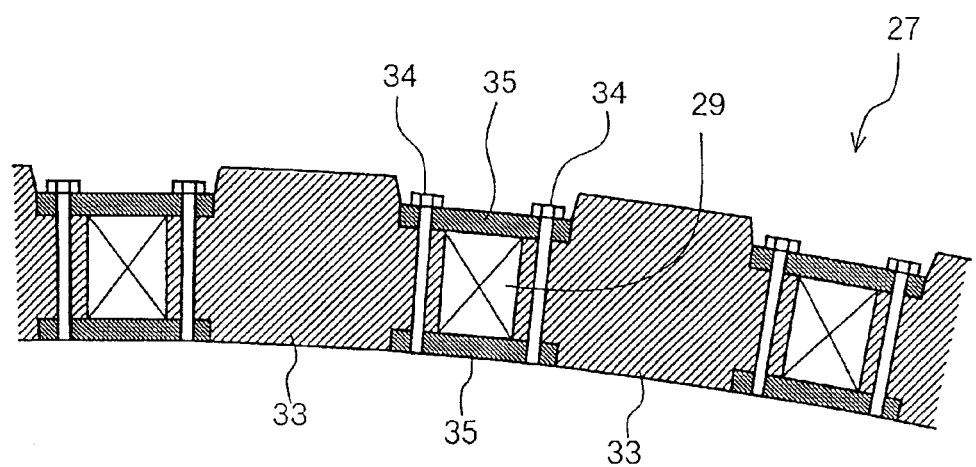
FIG. 11(d) is a front cross-sectional view showing a further modified example of the above magnetic ring.
Figure 11E:
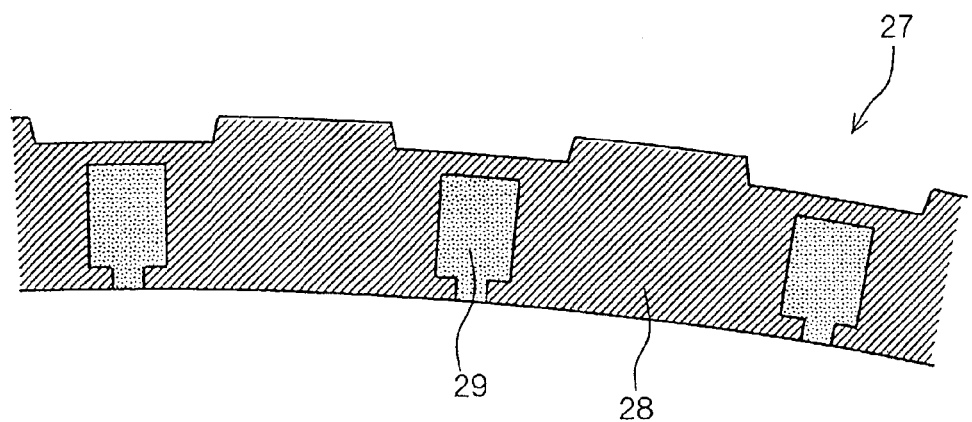
FIG. 11(e) is a front cross-sectional view showing a further modified example of the above magnetic ring.
Figure 11F:
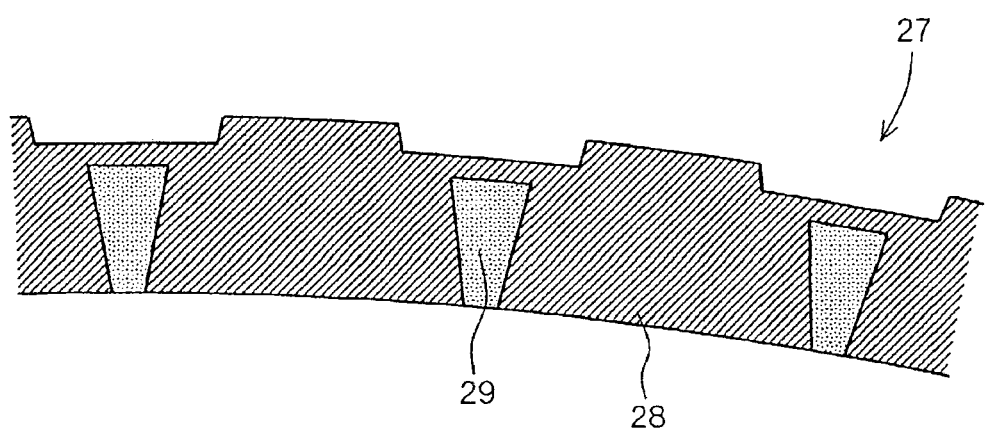
FIG. 11(f) is a front cross-sectional view showing a further modified example of the above magnetic ring.

Also, as shown in FIG. 11(*d*), the magnetic ring 27 may be constituted in ring shape by connecting blocks 33 made of magnetic bodies (soft magnetic members such as iron blocks or laminated electromagnetic steel sheet) by metal elements 35 fixed by bolts, screws or other fixing elements 34, with the permanent magnets 29 sandwiched therebetween. The metallic elements 35 are made of magnetic members (soft magnetic bodies such as electromagnetic steel sheet) or non-magnetic material (stainless steel or the like) could also be employed. As shown in FIG. 11(*e*) and FIG. 11(*f*), the permanent magnets 29 may be embedded in holes formed in the electromagnetic sheet steel 28 laminated in the thickness direction of the drawing sheet.

Essentially, the magnetic ring 27 may be constituted with a plurality of permanent magnets 29 embedded in an annular body 28 made of magnetic material, with prescribed spacing in the circumferential direction. Also, as shown in FIG. 8 to FIG. 10(*c*), the permanent magnets 29 comprise two pole faces at both end faces thereof in the circumferential direction and arranged such that the facing poles in the circumferential direction are of same polarity. Also, as shown in FIG. 8, the pitch in the circumferential direction of the permanent magnets 29 of the magnetic ring 27 is set to be substantially equal to the pitch of the permanent magnets 10 of the magnet ring 7 positioned on the inside thereof.

The operation of this embodiment constructed as above will now be described.

As shown in FIG. 8, when deceleration braking is turned on, the permanent magnets 10 of the magnet ring 7 and the permanent magnets 29 of the magnet ring 27 are put in a phase where identical polarity poles are adjacent to each other, by rotating the magnet ring 7 using the cylinder 8. When this is done, magnetic circuits 36, 37 are constituted by the permanent magnets 10 and 29 in the magnet ring 7 and magnetic ring 27 and the rotor 3.

The N poles and S poles of the permanent magnets 29 embedded in the magnetic ring 27 are then short-circuited 38 by the magnetic bodies at the outer circumference and inner circumference of the magnetic ring 27, with the result that the vicinity thereof is magnetically saturated. All of the magnetism of the permanent magnets 10 of the magnet ring 7 therefore goes to constituting the magnetic circuit 36 through the rotor 3, with no magnetic shielding (broken line 39) by the magnetic ring 27 by escaping in the circumferential direction through the vicinity of the magnetically saturated permanent magnets 29 of the magnetic ring 27. Eddy currents are therefore generated in the rotor 3, producing deceleration braking of the vehicle.

Figure 9:
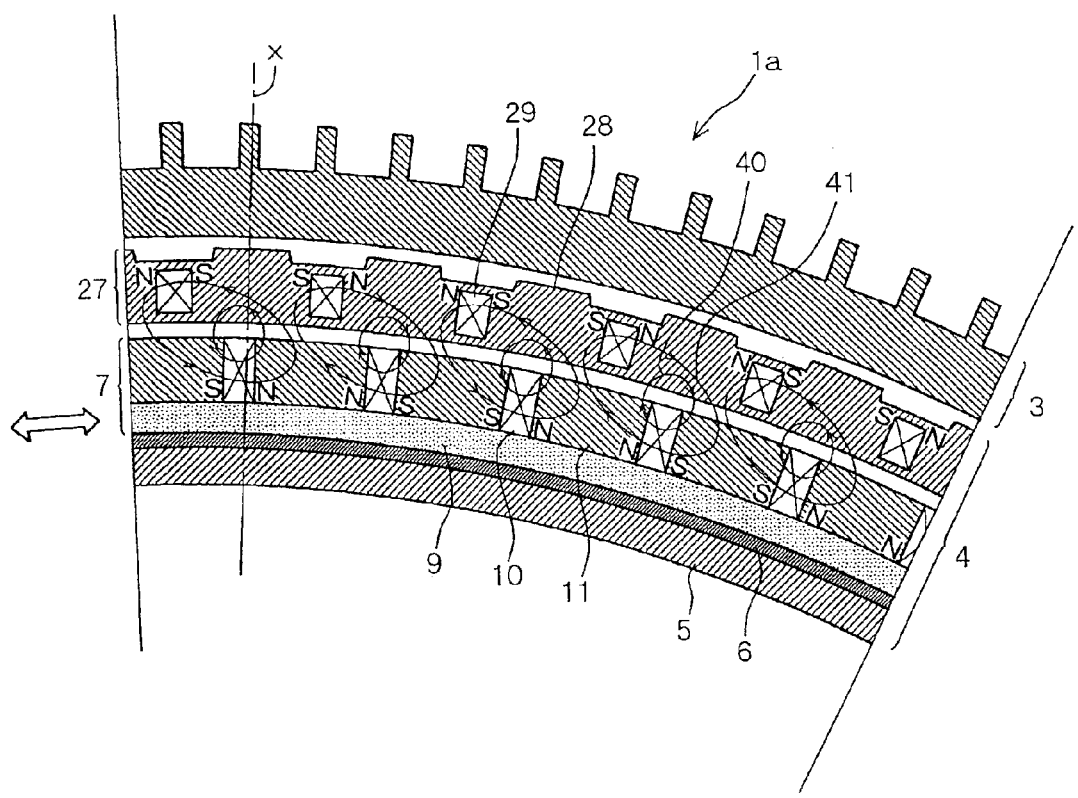
FIG. 9 is a front cross-sectional view of the above device (brake-OFF condition)

In contrast, when deceleration braking is turned off, as shown in FIG. 9, the permanent magnets 10 of the magnet ring 7 and the permanent magnets 29 of the magnetic ring 27 are put into a condition in which they are offset by ½ pitch to 1 pitch, by rotating the magnet ring 7. In FIG. 9, x represents ½ pitch. That is, the magnetism of the permanent magnets 10 of the magnet ring 7 is shielded by the magnetic ring 27. Specifically, part of the magnetism of the permanent magnets 10 of the magnet ring 7 is shielded by short-circuiting 40 through the magnetic bodies (annular bodies 28) between the permanent magnets 29, 29 of the magnetic ring 27 while the remainder thereof is shielded by short-circuiting 41 through the permanent magnets 29 of the magnetic ring 27. No eddy currents are therefore generated in the rotor 3 and deceleration braking is released.

Even when this braking is released, the permanent magnets 29 embedded in the magnetic ring 27 still produce magnetic saturation of the part of the magnetic ring 27 in their vicinity. Consequently, leakage of the magnetism of the permanent magnets 10 of the magnet ring 7 towards the rotor 3 passing through this magnetically saturated part in the radial direction is prevented. Dragging braking is thereby prevented. Also, since the permanent magnets embedded in the magnetic ring 27 are magnetically short-circuited by the interior of the magnetic ring 27, leakage of magnetism towards the rotor 3 is suppressed. For this reason also, dragging braking can be prevented.

Also, since the permanent magnets 10 of the magnet ring 7 and the permanent magnets 29 of the magnetic ring 27 are offset by a pitch that is slightly different from ½ pitch, rather than being exactly offset by ½ pitch, the magnetism of the permanent magnets 10 of the magnet ring 7 is short-circuited 41 with the permanent magnets 29 on the side closest to the magnetic ring 27. In this way, leakage of magnetism towards the rotor 3 can be prevented. Specifically, if the permanent magnets were to be offset by exactly ½ pitch, the shielding circuit 41 shown in FIG. 9 would be difficult to create, so leakage of magnetism is totally avoided by positively forming a shielding circuit 41 by offsetting by about ⅓ pitch (or slightly more or less than ½ pitch).

Also, compared with offsetting by 1 pitch, since the angle of rotation (sliding distance) of the magnet ring 7 can be made small, the actuator (cylinder 8) can be made of small size, enabling compactness of the device as a whole to be promoted. It should be noted that it would be possible to turn the braking force off even by offsetting the permanent magnets 10 of the magnet ring 7 and of the permanent magnets 29 of the magnetic ring 27 by 1 pitch, with the permanent magnets in a phase in which opposite polarity poles are mutually adjacent, in the same way as in case of the embodiment of FIG. 2. However, in this case, the angle of rotation (sliding distance) of the magnet ring 7 becomes large.

Preferably, the pitch of offset of the magnet ring 7 in the direction of rotation is 1 pitch when the amount of magnetic flux of the magnetic ring 27 and the amount of magnetic flux of the magnet ring 7 are substantially the same and is less than 1 pitch when the amount of magnetic flux of the magnetic ring 27 is smaller than the amount of magnetic flux of the magnet ring 7 (when the size of the magnets 27 is small).

Figure 12:
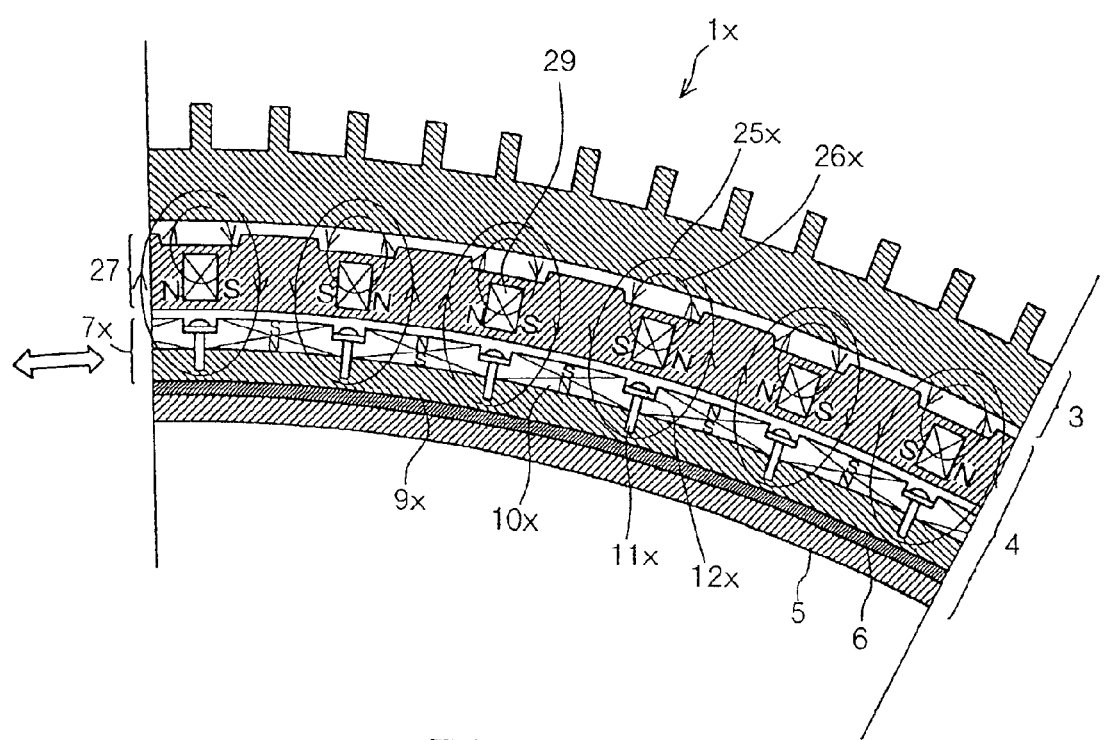
FIG. 12 is a front cross-sectional view of an eddy current deceleration device (brake-ON condition) according to a further embodiment of the invention according to claim 2.
Figure 13:
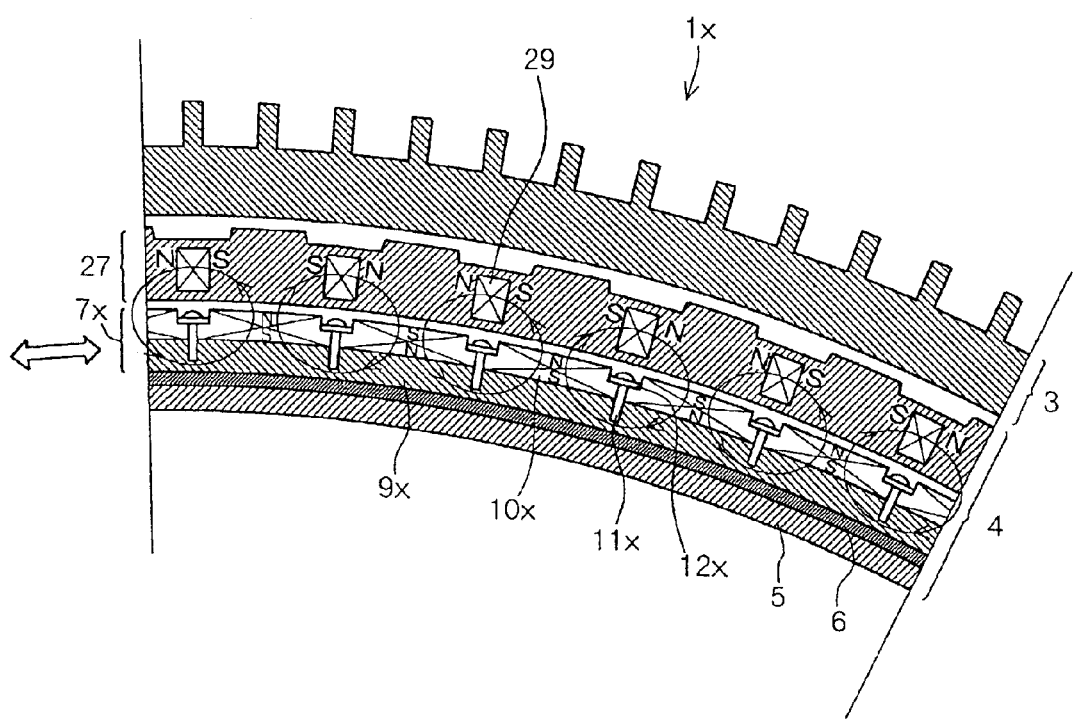
FIG. 13 is a front cross-sectional view of the above eddy current deceleration device (brake-OFF condition)

A further embodiment is illustrated in FIG. 12 and FIG. 13.

As illustrated, in this embodiment (eddy current deceleration device 1*x*), only the construction of the magnet ring 7 of the embodiment shown in FIG. 8 is altered; the rest of the construction is the same. The magnet ring 7*x* of this embodiment comprises a support ring 9*x* made of a magnetic body, a plurality of permanent magnets 10*x* mounted with a prescribed spacing in the circumferential direction at the outer circumferential surface of the support ring 9*x* and a non-magnetic body (bolt or screw or the like fixing element 11*x* used to fix the magnets) interposed between the permanent magnets 10*x*.

The permanent magnets 10*x* have magnetic poles on the outside end face and inside end face in the radial direction and are arranged with magnets that are adjacent in the circumferential direction being of opposite polarity. As in the example illustrated, if fixed metal elements 12*x* made of a non-magnetic body formed with the same length as the magnets 10*x* in the axial direction are interposed between the permanent magnets 10*x*, magnetic bodies may be employed for screws or the like 11*x* used to fix these permanent magnets.

With this construction, deceleration braking is turned on by rotating the magnet ring 7*x* as shown in FIG. 12 so that the permanent magnets 10*x* of the magnet ring 7*x* and the rotor 3 are magnetically connected by the magnetic circuit 25x and the permanent magnets 29 of the magnetic ring 27 and the rotor 3 are magnetically connected by the magnetic circuit 26x. In contrast, deceleration braking is released by rotating the magnet ring 7x as shown in FIG. 13 so that the permanent magnets 10x of the magnet ring 7x and the permanent magnets 29 of the magnetic ring 27 are magnetically short-circuited.

Figure 14:
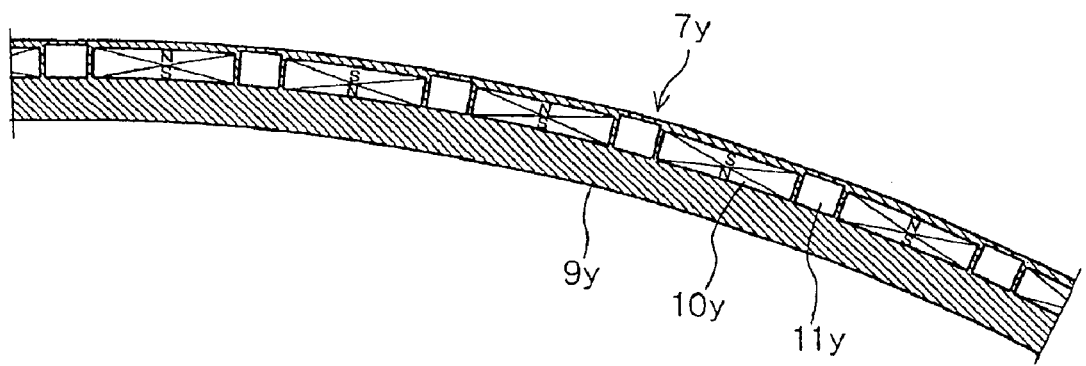
FIG. 14 is a front cross-sectional view showing a modified example of a magnetic ring of the above device.

Alternatively, the magnet ring 7x of this embodiment may be of a construction 7y as shown in FIG. 14. The magnet ring 7y in FIG. 14 comprises permanent magnets 10y integrally embedded in a ring 9y made of a magnetic body with cavities (holes) 11y constituted by magnetically insulating bodies formed between the permanent magnets 10y. The same beneficial action as in the case of FIG. 12 and FIG. 13 may be obtained using this magnet ring 7y.

Figure 15:
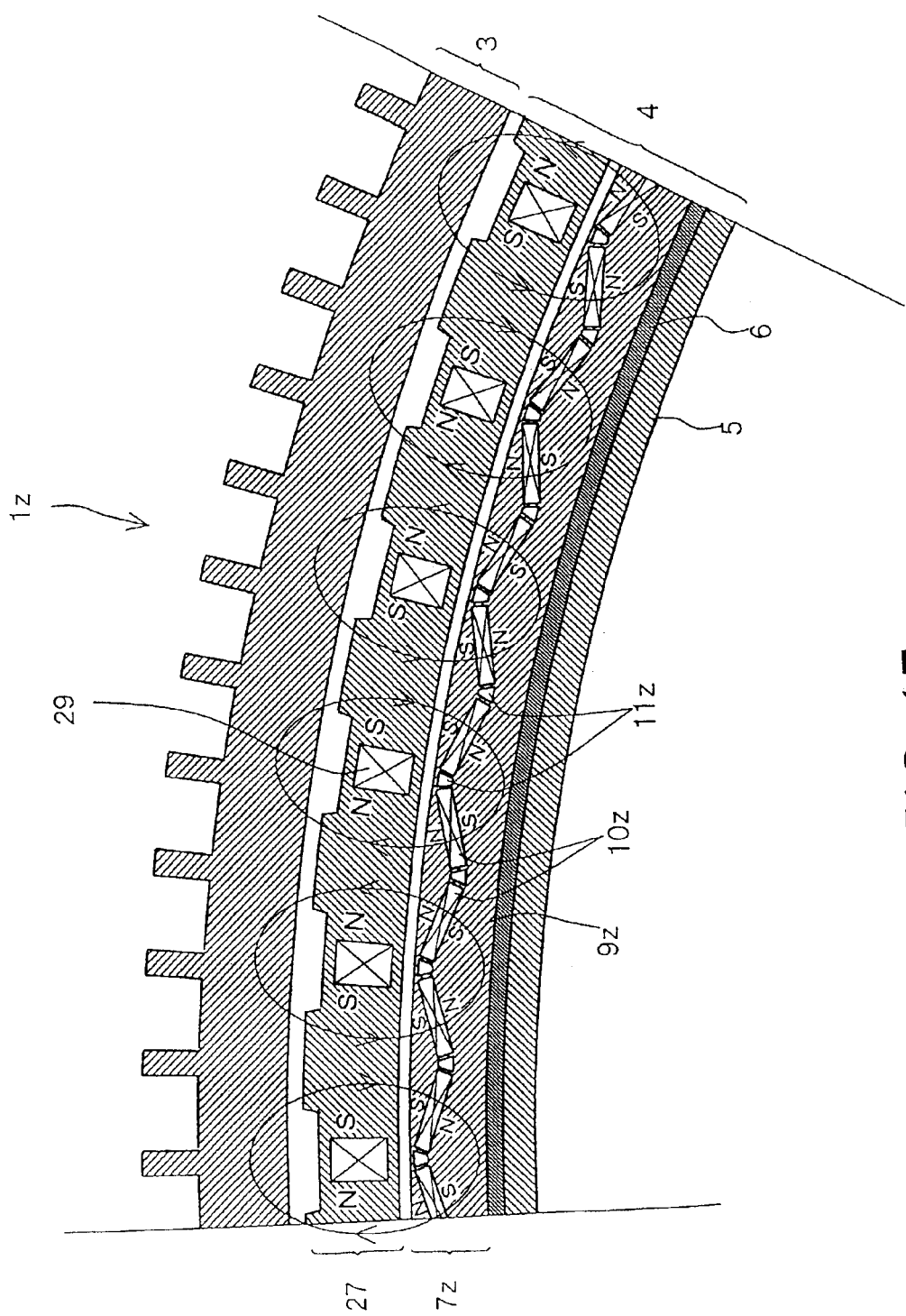
FIG. 15 is a front cross-sectional view (brake-ON condition) of an eddy current deceleration device comprising a further modified example of the above magnetic ring.

Alternatively, the magnet ring 7y may have a construction 7z as shown in FIG. 15. This magnet ring 7z comprises sets of pairs of permanent magnets 10z arranged in hill/valley fashion integrally embedded in a ring 9z made of a magnetic body and is formed with cavities (holes) 11z act as magnetically insulating bodies between the permanent magnets 10z.

Employing such a magnet ring 7z, deceleration braking is turned on by magnetically connecting the permanent magnets 10z of the magnet ring 7z and the rotor 3 by rotating the magnet ring 7z as shown in FIG. 15. It should be noted that, in fact, preferably the permanent magnets 10z are made thicker than illustrated and the cavities 11z are made larger than illustrated. This is in order to obtain strong magnetic force and a high degree of magnetic insulation.

Figure 16:
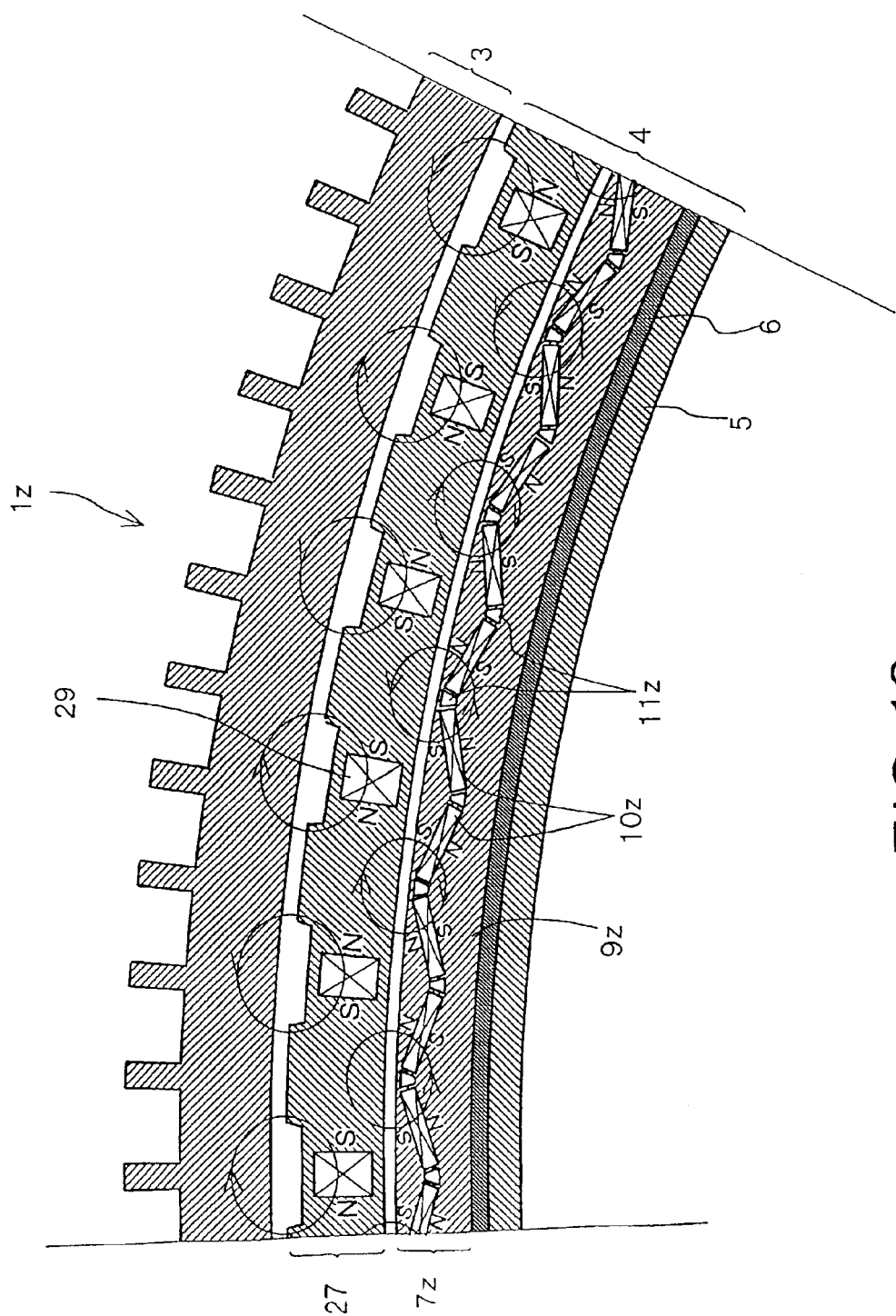
FIG. 16 is a front cross-sectional view of the above eddy current deceleration device (weak braking force condition)

If the magnet ring 7z is rotated as shown in FIG. 16, the permanent magnets 10z of the magnet ring 7z are magnetically shielded by the magnetic ring 27, so the magnetism of the magnet ring 7z is not connected with the rotor 3 and only the magnetism of the permanent magnets 29 of the magnetic ring 27 is connected with the rotor 3. The braking force is thereby attenuated. That is, the thickness of the magnetic body on the radially outer side of the permanent magnets 29 is set to a low value in order to attenuate the magnetic shielding effect and so achieve magnetic connection of the magnets 29 and rotor 3.

Figure 17:
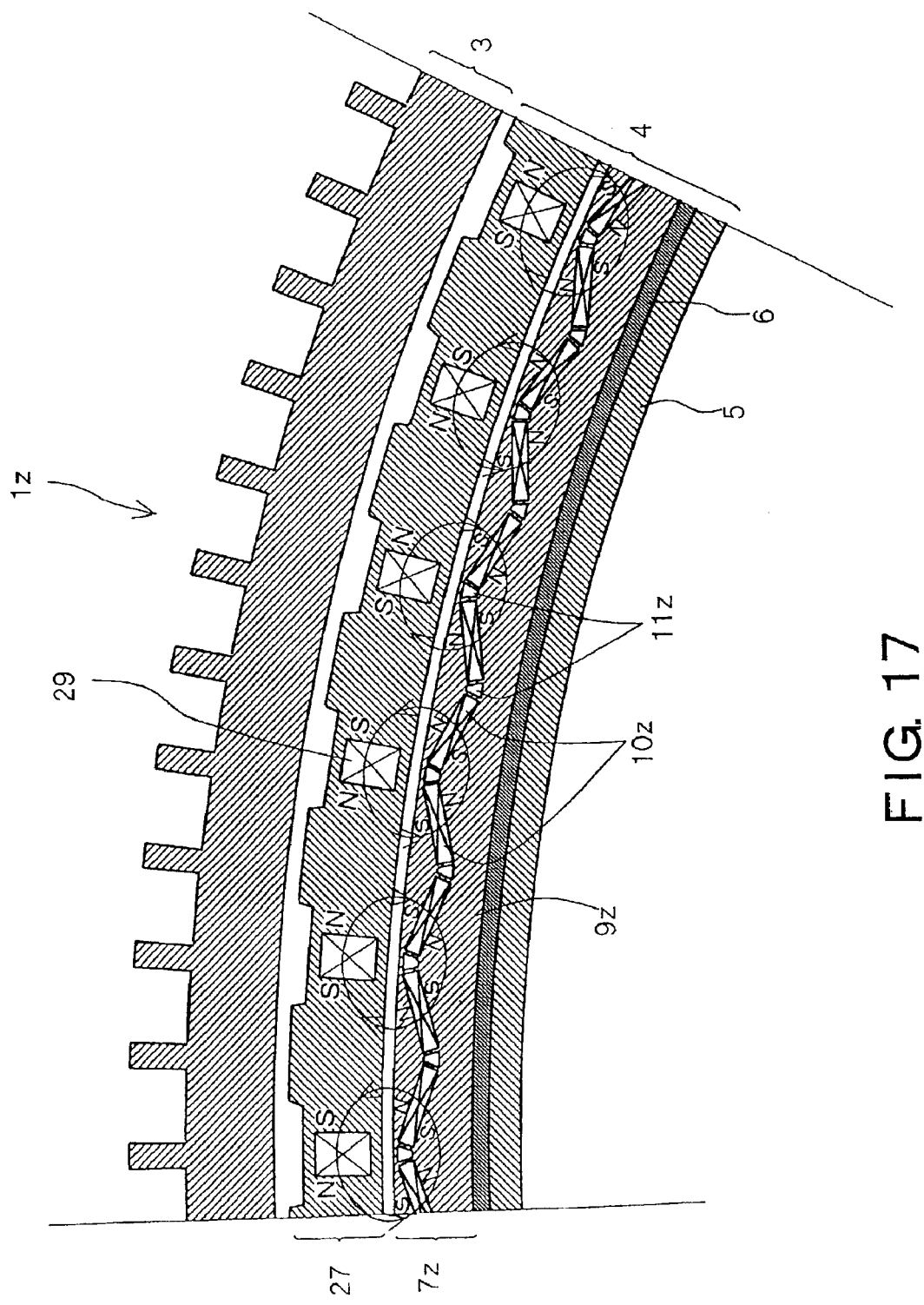
FIG. 17 is a front cross-sectional view of the above eddy current deceleration device (brake-OFF condition)

Furthermore, deceleration braking is released by rotating the magnet ring 7z as shown in FIG. 17, because the permanent magnets 10z of the magnet ring 7z and the permanent magnets 29 of the magnetic ring 27 are magnetically short-circuited. In this case, the magnetism of the permanent magnets 10z of the magnet ring 7z is short-circuited with the permanent magnets 29 of the magnetic ring 27, which is more easily connected therewith than the rotor 3, so magnetic leakage to the rotor 3 is suppressed.

Also, by arranging permanent magnets 10z in hill/valley fashion in the magnet ring 7z constructed as shown in FIG. 15, the pole area of the permanent magnets 10z with respect to the inner circumferential surface of the magnetic ring 7z (i.e. the inner circumferential surface of the rotor 3) can be made larger than in the case of the type shown in FIG. 12 to FIG. 14, so braking force can be increased.

Figure 18A:
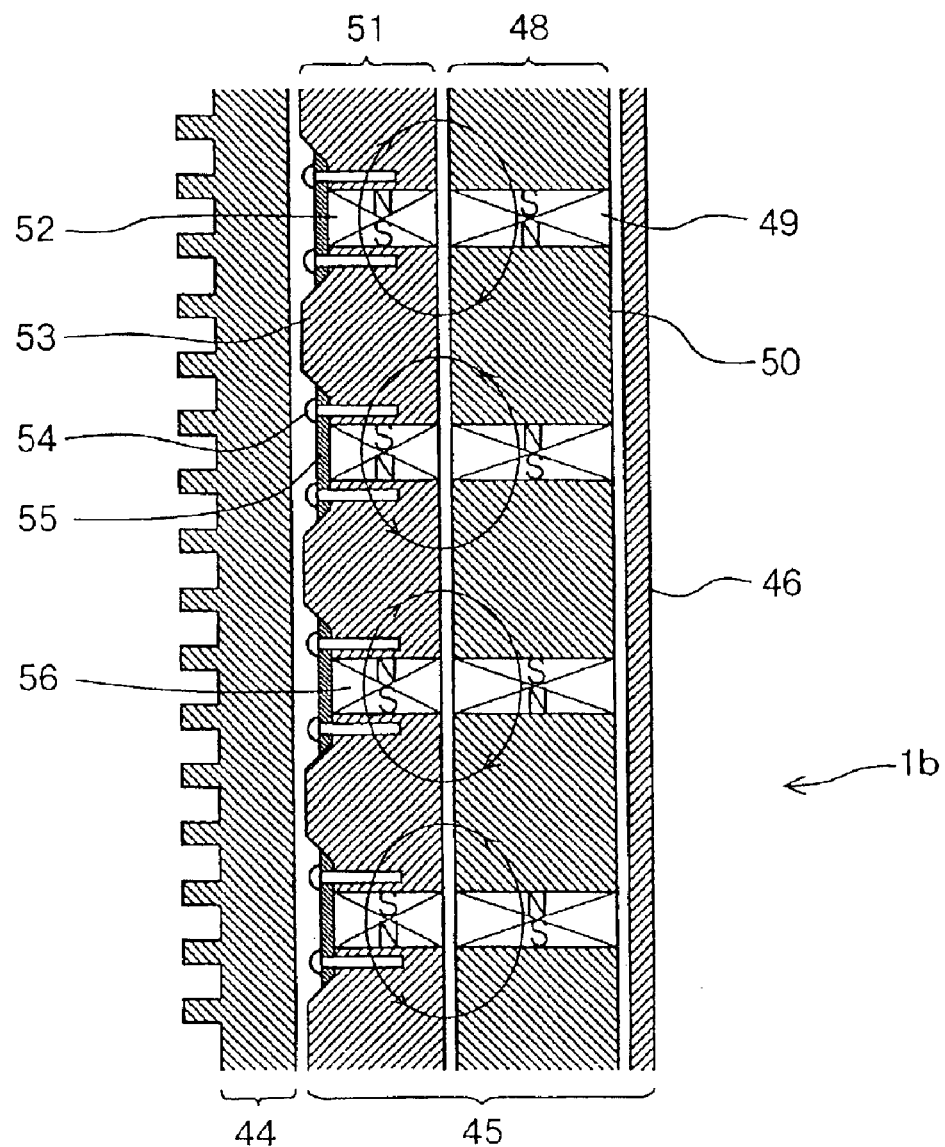
FIG. 18(a) is a plan cross-sectional view of an eddy current deceleration device (brake-OFF condition) according to an embodiment in which the above rotor is of the disk type.
Figure 18B:
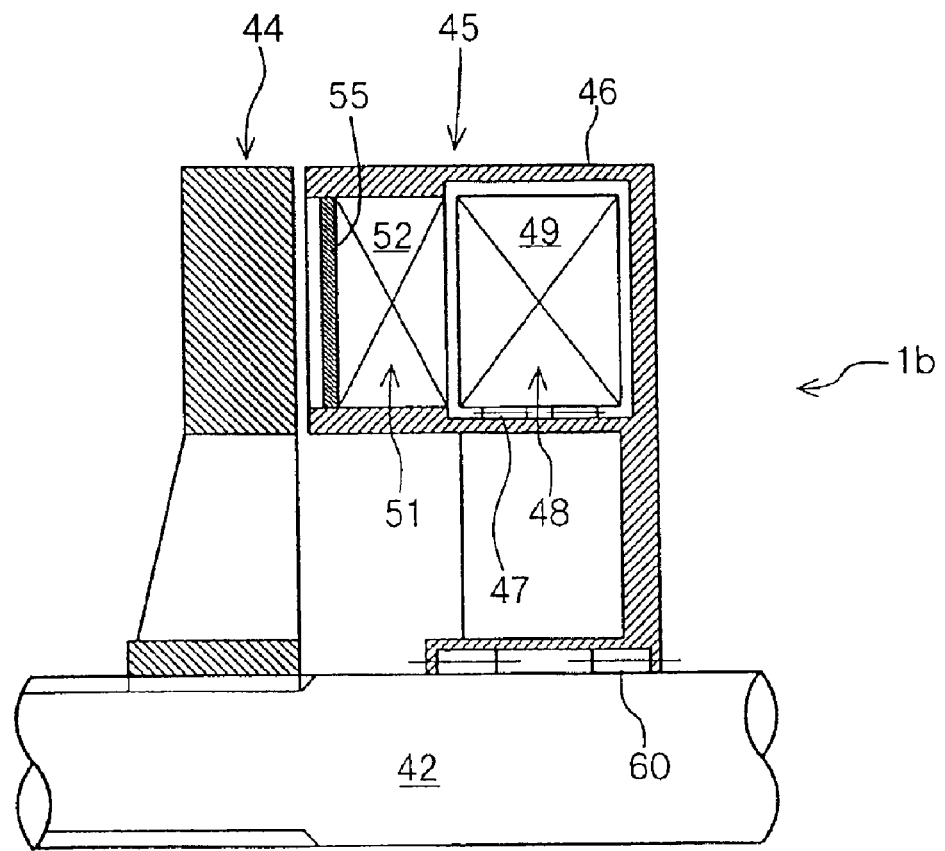
FIG. 18(b) is a side cross-sectional view of the above eddy current deceleration device.
Figure 19:
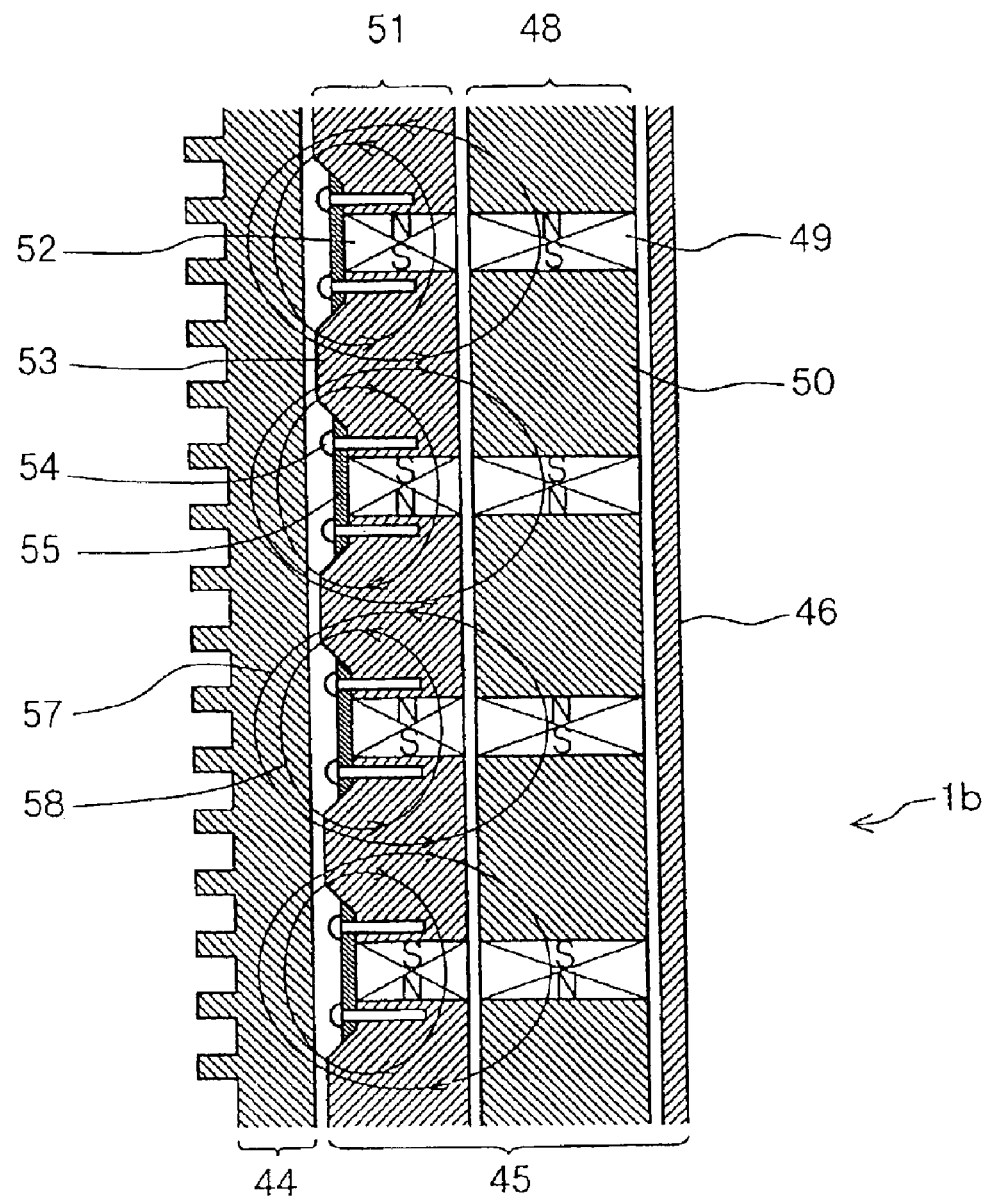
FIG. 19 is a plan cross-sectional view of the brake-ON condition of the above device.

A further embodiment is shown in FIG. 18(a), FIG. 18(b) and FIG. 19.

As shown in this Figure, in this embodiment, the rotor 3 is made of a disk type rather than of the drum type that has been employed hitherto.

As shown in FIG. 18(a) and FIG. 18(b), this eddy current deceleration device 1b comprises a disk-shaped rotor 44 mounted on a rotary shaft 42 of a power transmission system such as the drive shaft of a vehicle and a stator 45 (source of magnetic force) mounted on a fixed system such as a vehicle transmission arranged opposite the rotor 44. Deceleration braking of the vehicle is performed by generating eddy currents in the rotor 44 by supplying magnetism to the rotor 44 from the stator 45 and deceleration braking is released by shielding the magnetism in the stator 45.

The stator 45 comprises: a hollow ring-shaped casing 46 that is mounted on a fixed system, not shown, and is journaled by bearings 60 on a rotary shaft 42; a first magnet ring 48 that is freely rotatably accommodated by means of a bush or bearings 47 in the casing 46 and an actuator (fluid cylinder or the like), not shown, that rotates the first magnet ring 48. The first magnet ring 48 comprises a plurality of permanent magnets 49 arranged with a prescribed spacing in the circumferential direction and magnetic members 50 (iron or the like) interposed between the permanent magnets 49. The permanent magnets 49 comprise pole faces at both end faces in the circumferential direction and are arranged with poles facing in the circumferential direction being of same polarity.

In addition, there is integrally provided a second magnet ring 51 comprising permanent magnets and magnetic members like the permanent magnets 49 and magnetic members 50 of the first magnet ring 48 arranged in the casing 46 between the first magnet ring 48 and the rotor 44. Specifically, the second magnet ring 51 comprises a plurality of permanent magnets 52 arranged with facing poles in the circumferential direction being of the same polarity and mounted with a prescribed spacing in the circumferential direction and magnetic members 53 (iron or like) interposed between the permanent magnets 52. The pitch/ circumferential length of the permanent magnets 49, 52 and the magnetic members 50, 53 of the magnet rings 48, 51 are set to be mutually equal. The magnetic members 50, 53 constitute pole pieces of the permanent magnets 49, 52.

The second magnet ring 51 is constituted in ring shape by connecting magnetic members 53, 53 formed for example in block shape sandwiching the permanent magnets 52 by means of connecting elements 55 that are fixed by means of bolts, screws or other fixing elements 54. An embodiment of the invention according to claim 1 is constituted by forming these connecting elements 55 of non-magnetic bodies while an embodiment of the invention according to claim 2 is constituted by forming the connecting elements 55 of magnetic bodies. This is because, in the latter case, the second magnet ring 51 is in a condition in which permanent magnets 52 are embedded in a magnetic body and so constitutes a magnetic ring according to the invention of claim 2.

The operation of this embodiment will now be described (in the case in which the connecting elements 55 are formed of non-magnetic bodies).

When deceleration braking of this eddy current deceleration device 1b is turned off, as shown in FIG. 18(a), the permanent magnets 49 of the first magnet ring 48 and the permanent magnets 52 of the second magnet ring 51 are put in a phase in which they are adjacent to opposite polarity poles, by rotating the first magnet ring 48 by means of an actuator, not shown. When this is done, the permanent magnets 49 of the first magnet ring 48 and the permanent magnets 52 of the second magnet ring 51 are mutually magnetically short-circuited to constitute a shielding magnetic circuit 56, with the result that no eddy currents are generated in the rotor 44 and deceleration braking does not occur.

In contrast, when deceleration braking is turned on, as shown in FIG. 19, the permanent magnets 49 of the first magnet ring 48 and the permanent magnets 52 of the second magnet ring 51 are put in a phase in which identical polarity poles are adjacent to each other, by rotating the first magnet ring 48. Magnetic circuits 57, 58 are then constituted by the permanent magnets 49, 52 of the first and second magnet rings 48, 51 and the rotor 44, generating eddy currents in the rotor 44 and thereby performing deceleration braking of the vehicle.

During deceleration braking shown in FIG. 19, the respective permanent magnets 49, 52 of the first and second magnet rings 48, 51 are in a condition in which they are lined up in pairs with identical polarity poles along the radial direction, so strong magnetic force is exhibited by the sets respectively constituted by these pairs of permanent magnets. Accordingly, a strong braking force such as would be produced by the magnetic force of a permanent magnet of substantially the length of two such permanent magnets is obtained.

Also, the respective permanent magnets 49, 52 of the first and second magnet rings 48, 51 can be separately magnetized in the respective first magnet ring 48 and second magnet ring 51 after assembly, with the permanent magnets 49, 52 when this magnetization is performed being of length half the length of the sets described above constituted by two magnets. Consequently, even if the spacing between adjacent permanent magnets 49 and 49 or 52 and 52 in the circumferential direction is reduced, ample magnetization can still be achieved. Braking force is therefore improved.

It should be noted that, if the connecting elements 55 are formed of magnetic bodies, the magnetic flux when braking is turned on/off is as shown in FIG. 8 and FIG. 9. That is, in this case, in order to turn braking off, it suffices to create offset of the first magnet ring 48 by an amount smaller than 1 pitch (for example ⅓ pitch or ⅔ pitch) (not shown in the drawings).

Figure 20A:
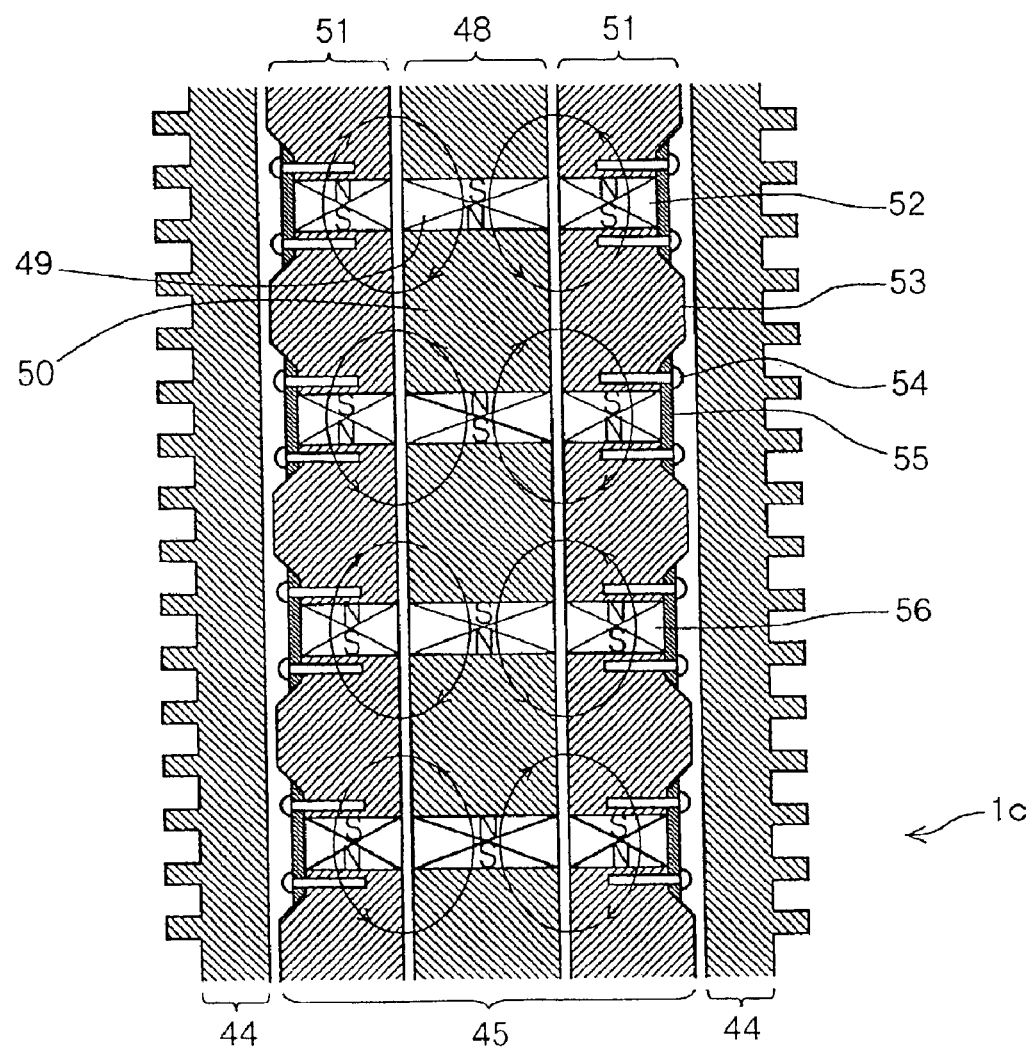
FIG. 20(a) is a plan cross-sectional view of an eddy current deceleration device (brake-OFF condition) according to an embodiment in which the above rotor is of the twin disk type.
Figure 20B:
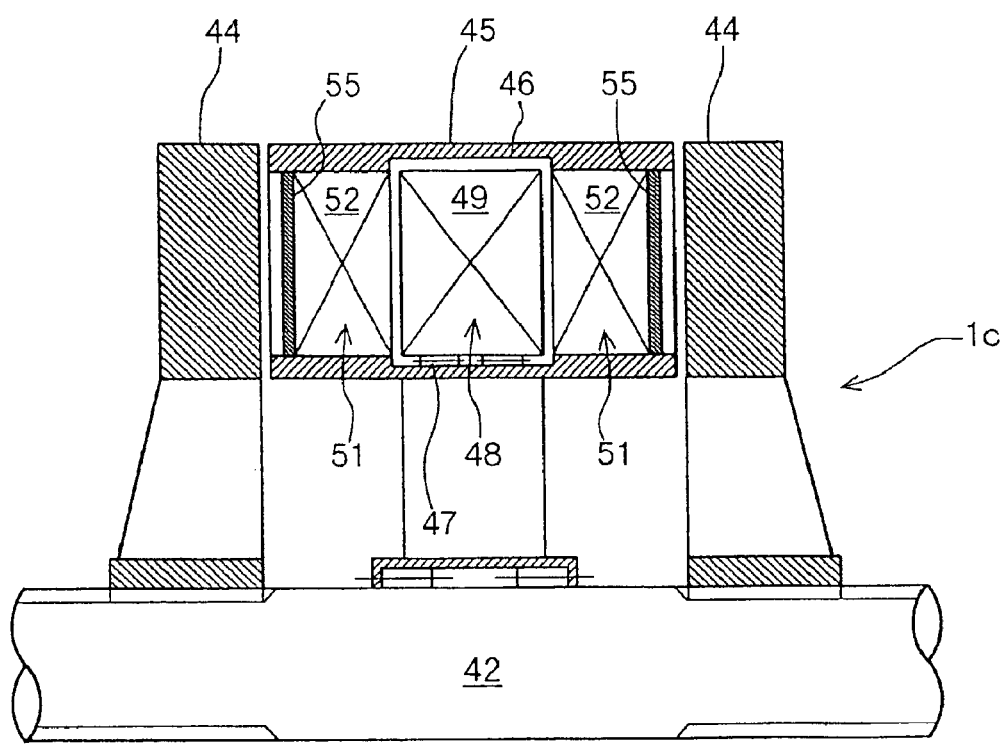
FIG. 20(b) is a side cross-sectional view of the above eddy current deceleration device.
Figure 21:
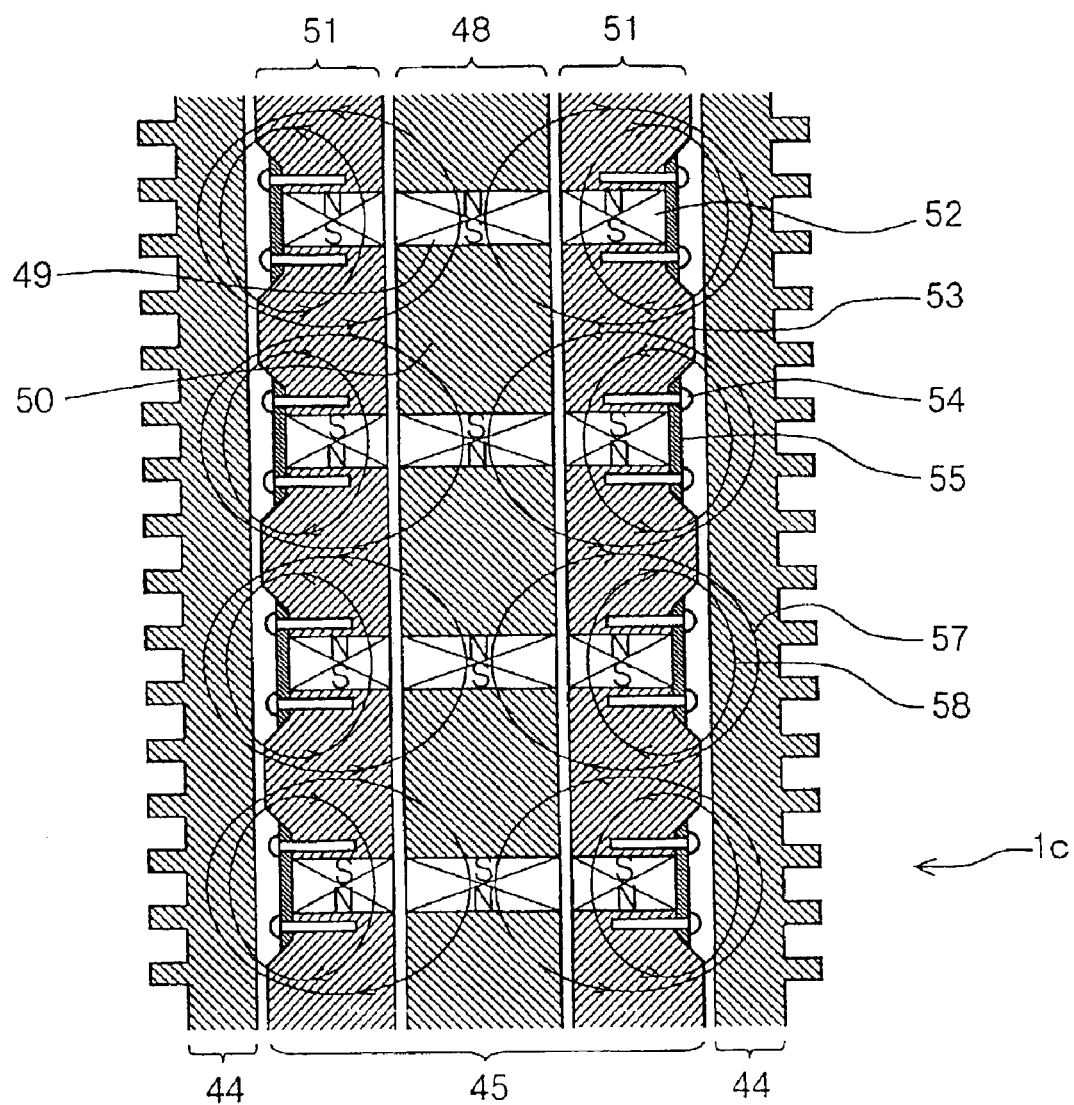
FIG. 21 is a plan cross-sectional view of the brake-ON condition of the above device.

A further embodiment is illustrated in FIG. 20(a), FIG. 20(b) and FIG. 21.

As shown in these Figures, the eddy current deceleration device 1c according to this embodiment differs from the previous embodiment only in that two rotors 44 according to the previous embodiment are employed and the stator 45 is arranged therebetween. Like components are therefore given the same reference symbols and further description thereof is omitted.

In this embodiment also, braking is turned off by rotating the first magnet ring 48 as shown in FIG. 20(a) by means of the actuator and braking is turned on by rotating the first magnetic ring 48 as shown in FIG. 21. In this embodiment also, an embodiment of the invention according to claim 1 is obtained if the connecting elements 55 are formed of non-magnetic bodies and an embodiment of the invention according to claim 2 is obtained if the connecting elements are formed of magnetic bodies.

Figure 22:
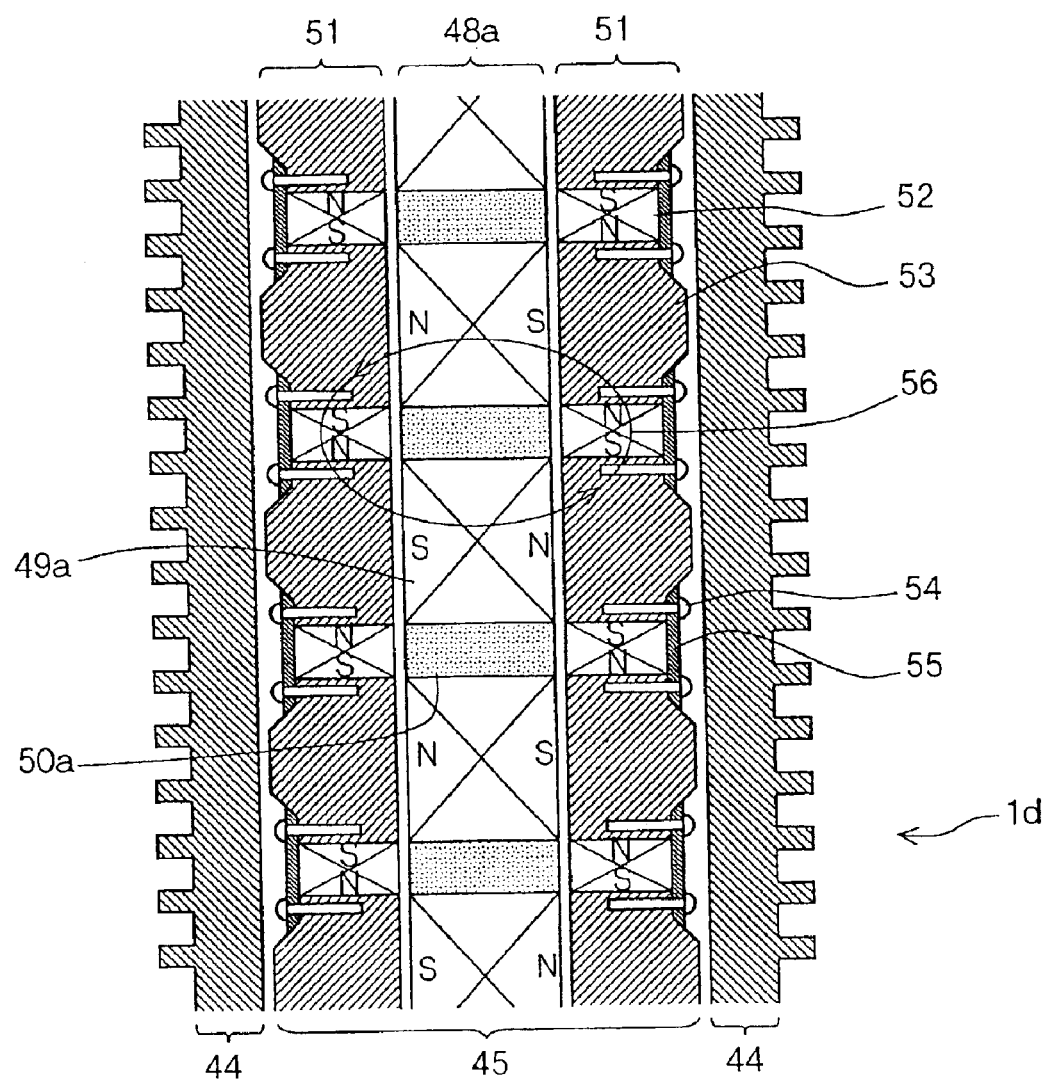
FIG. 22 is a plan cross-sectional view showing a modified example of the first magnetic ring of the above device (brake-OFF condition)
Figure 23:
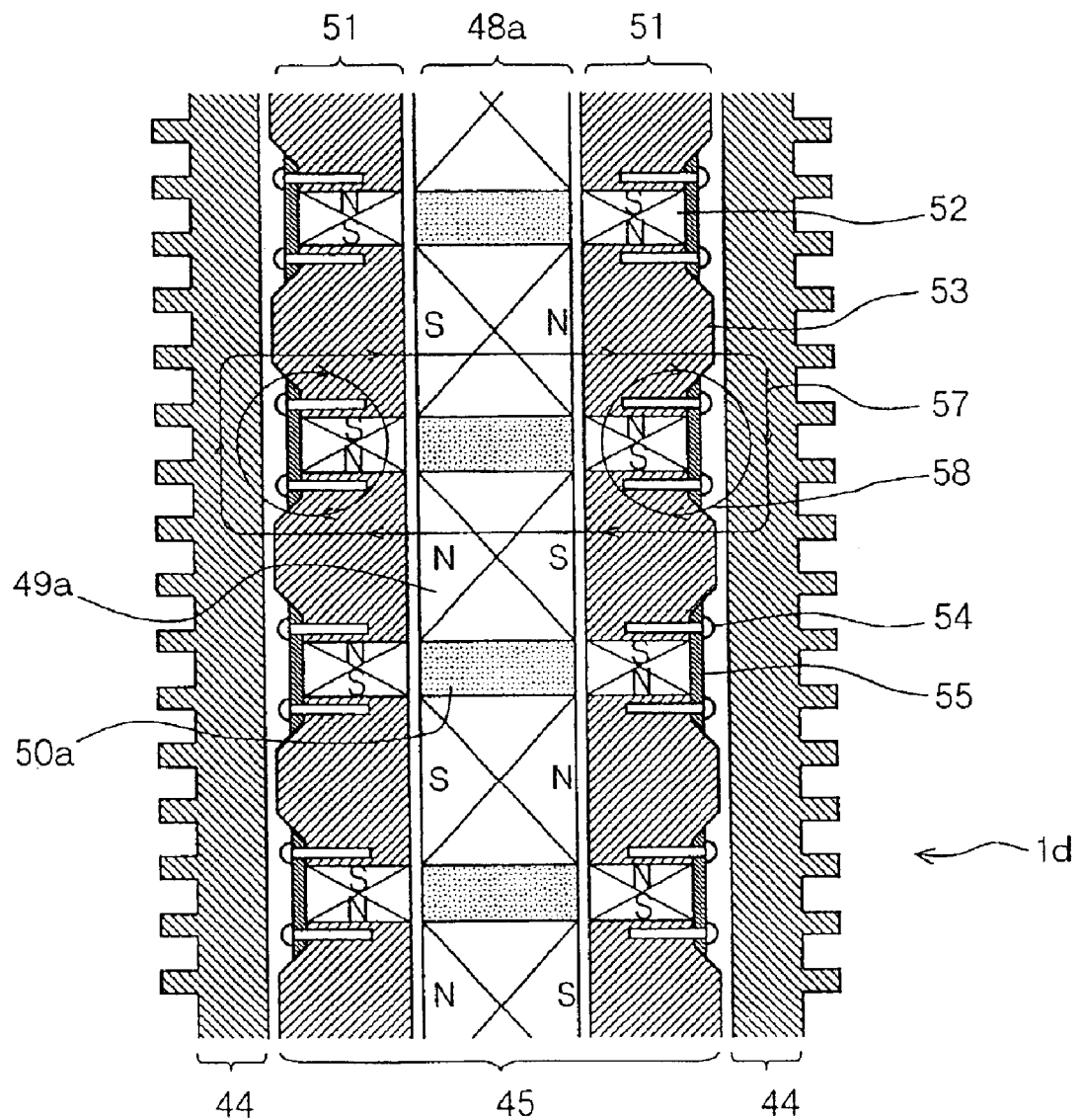
FIG. 23 is a plan cross-sectional view of the brake-ON condition of the above device.

A further embodiment is illustrated in FIG. 22 and FIG. 23.

As shown in the drawings, an eddy current deceleration device 1d according to this embodiment is of substantially the same construction as the eddy current deceleration device 1c according to the first embodiment illustrated in FIG. 20(a), FIG. 20(b) and FIG. 21 and differs only in regard to the construction of the first magnet ring 48, which is accommodated in the casing 46 of the stator 45. Like components are therefore given the same reference symbols and further description thereof is omitted, only the points of difference being described.

As shown in FIG. 22 and FIG. 23, this first magnet ring 48a comprises a plurality of permanent magnets 49a arranged with a prescribed spacing in the circumferential direction with non-magnetic members 50a provided between the permanent magnets 49a. The permanent magnets 49a have poles at the opposite ends in the axial direction and are arranged with the polarities of adjacent magnets being opposite.

In this embodiment also, braking is turned off by rotating the first magnet ring 48a as shown in FIG. 22 by means of an actuator and braking is turned on by rotating the first magnet ring 48a as shown in FIG. 23.

It should be noted that, although, in each of the above embodiments, a type was described in which the first magnet ring was rotated without rotating the second magnet ring, it would, contrariwise, be possible to rotate the second magnet ring without rotating the first magnet ring, or indeed to rotate both magnet rings.

An embodiment of the invention according to claim 5 will now be described

Figure 24:
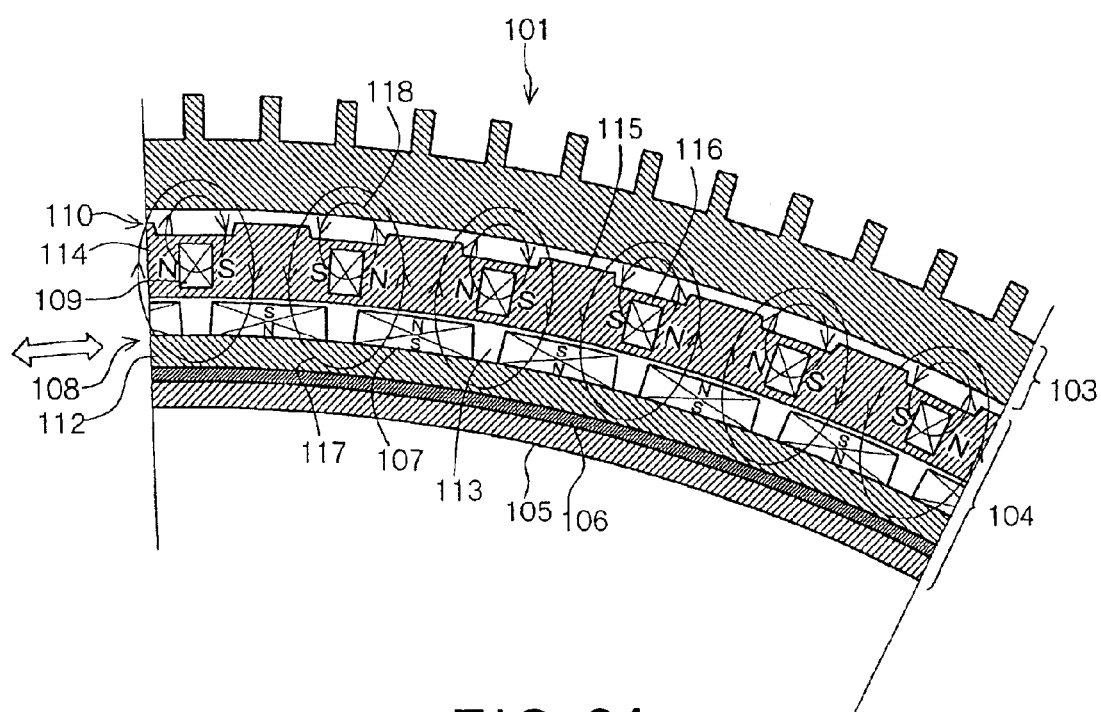
FIG. 24 is a front cross-sectional view of an eddy current deceleration device in the brake-ON condition showing an embodiment of a device according to claim 5.
Figure 25:
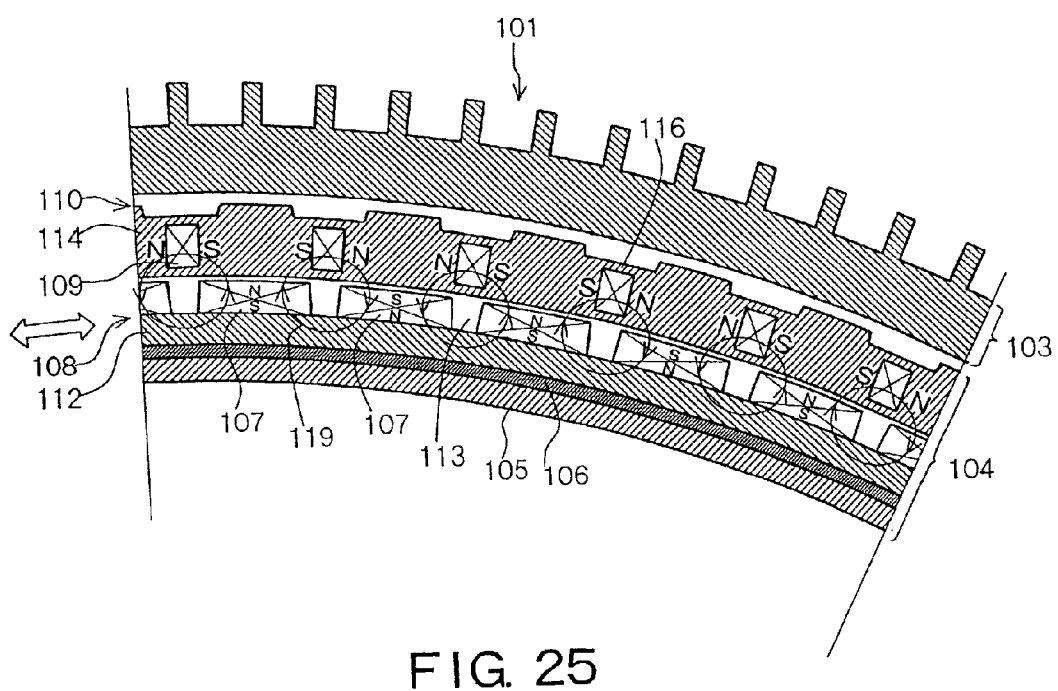
FIG. 25 is a front cross-sectional view of an eddy current deceleration device according to FIG. 24 in the brake-OFF condition.

FIG. 24 is a front cross-sectional view of an eddy current deceleration device according to an embodiment in which deceleration braking is achieved by applying magnetism to the rotor, seen from the direction of the end of the drive shaft; FIG. 25 is a front cross-sectional view of an eddy current deceleration device when deceleration braking is turned OFF and FIG. 26 is a lateral cross-sectional view of an eddy current deceleration device seen from outside the rotor in the radial direction.

Figure 26:
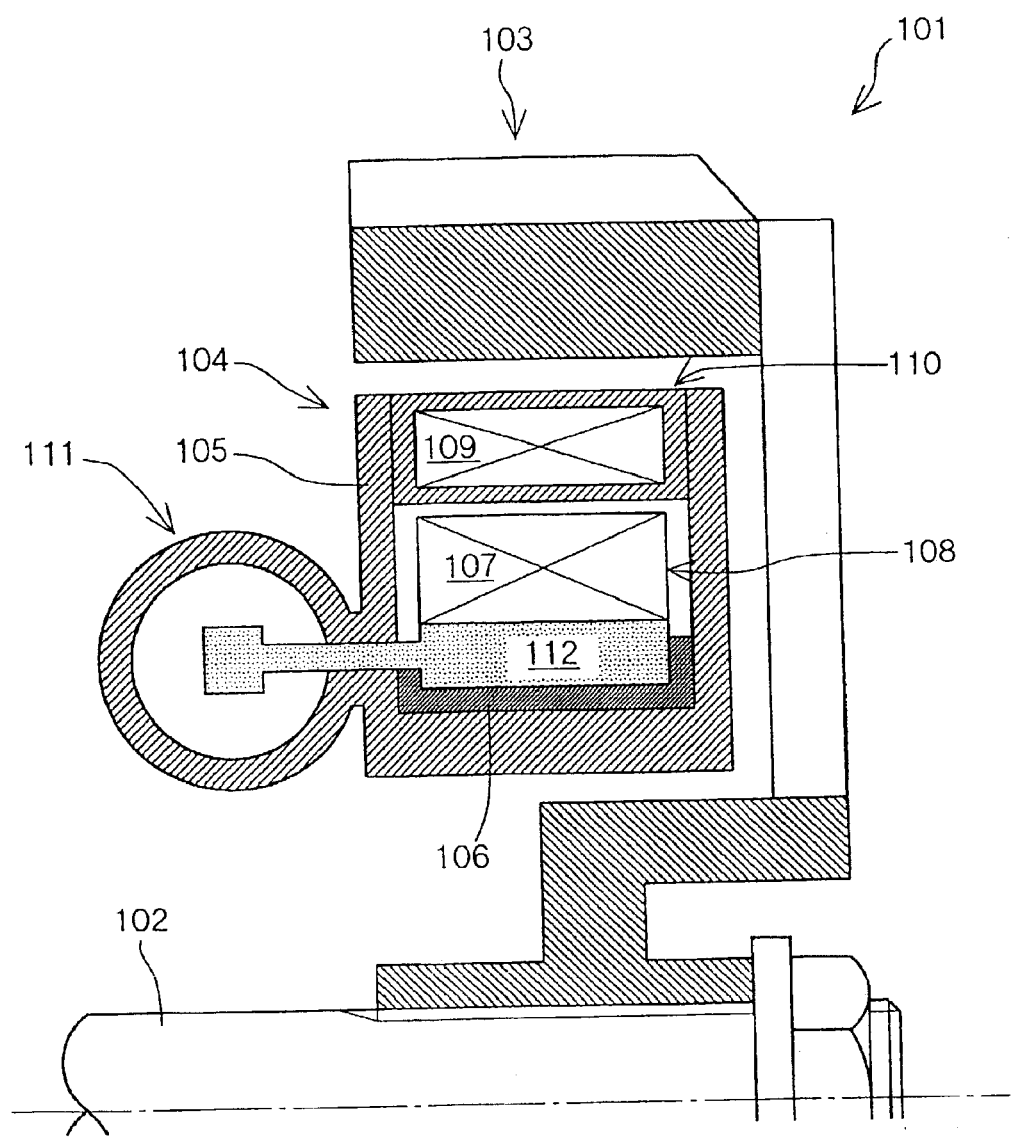
FIG. 26 is a side cross-sectional view of the above eddy current deceleration device.

As shown in FIG. 26, this eddy current deceleration device 101 comprises a drum-shaped rotor 103 mounted on a rotary shaft 102 of a power transmission system such as the drive shaft of a vehicle and a stator (source of magnetic force) 104 mounted on a fixed system (not shown) such as a vehicle transmission arranged along the inner circumference of a rotor 103. Deceleration braking of the rotary shaft 102 is achieved by generating eddy currents in the rotor 103 by supplying magnetism to the rotor 103 from the stator 104 and deceleration braking is released by shielding the magnetism in the stator 104.

The stator 104 comprises a casing 105 formed in hollow shape supported on a fixed system, a magnet ring 108 having a plurality of permanent magnets 107 accommodated so as to be freely rotatable about a common axis by means of a bush 106 in the casing 105, a magnetic ring 110 having a plurality of permanent magnets 109 integrally provided in an outer circumferential portion of the casing 105 so as to be positioned between the magnet ring 108 and the rotor 103 and an actuator (fluid cylinder or the like) 111 used to rotate the magnet ring 108.

As shown in FIG. 24, the magnet ring 108 comprises a support ring 112 made of a magnetic body (laminated body of electromagnetic steel sheet or iron block member or the like) engaged with the outer circumference of the bush 106 and a plurality of permanent magnets 107 arranged facing the rotor 103 mounted at a prescribed pitch (spacing) in the circumferential direction at the outer circumference of the support ring 112.

Specifically, the permanent magnets 107 are arranged with their respective poles directed radially and alternately inverted in the circumferential direction. That is, the permanent magnets 107 have respective poles at their outside ends and inside ends in the radial direction and adjacent poles in the circumferential direction are arranged to have alternate polarity.

Also, respective spaces 113 are formed between permanent magnets 107 that are adjacent in the circumferential direction, so that magnetism that is generated from the permanent magnets 107 is not short-circuited.

The magnetic ring 110 is constituted by embedding a plurality of permanent magnets 109 at a prescribed pitch (spacing) in the circumferential direction in the interior of an annular magnetic member 114 made of a magnetic body (for example, a soft magnetic member such as an iron block member or laminated electromagnetic steel sheet); pole pieces are formed by the magnetic members 114. The permanent magnets 109 are embedded so as to be held in particular covering the face on the side of the rotor 103.

The permanent magnets 109 of the magnetic ring 110 are arranged to be of the same number as the permanent magnets 107 of the magnet ring 108 and are respectively in one-to-one correspondence with the permanent magnets 107 of the magnet ring 108. The relative phases of the mutually corresponding permanent magnets 107, 109 can be varied in common by rotating the magnet ring 108.

Also, the permanent magnets 109 of the magnetic ring 110 are arranged so as to emit magnetism of the same intensity as the respective permanent magnets 107 of the magnet ring 108 and are arranged such that respective facing poles thereof in the circumferential direction are of same polarity.

The magnetic members 114 have raised portions 115 projecting on the side of the rotor 103 (radially outwards) between the permanent magnets 109 so as to efficiently transmit the magnetism emitted from the magnetic ring 110 and magnet ring 108 towards the rotor 103 during deceleration braking. Also, the covering section 116 that covers the portions of the magnetic members 114 facing the rotor 103 is formed of sufficiently small thickness to be isolated from the rotor 103.

An actuator 111 is formed so as to be able, by rotating the magnet ring 108, to set one of a phase (braking position: FIG. 24) in which permanent magnets 107, of the permanent magnets 107 of the magnet ring 108, with faces (poles) which are of the same polarity as the aforesaid poles facing radially outwards (towards the rotor 103) are sandwiched at equal intervals between adjacent permanent magnets 109 with identical polarity poles facing in the circumferential direction of the magnetic ring 110, and a phase (non-braking position: FIG. 25) in which permanent magnets 107, of the permanent magnets 107 of the magnet ring 108, in which opposite polarity poles face radially outwards are sandwiched therebetween at equal intervals.

Specifically, the actuator 111, by rotating the magnet ring 108, sets one of a phase (braking position: FIG. 24) in which permanent magnets 107, of the permanent magnets 107 of the magnet ring 108, which are of the same polarity as the permanent magnets 109 are sandwiched the aforesaid magnetic members 114, face the magnetic members 114 between the permanent magnets 109 of the magnetic ring 110, and a phase (non-braking position: FIG. 25) in which permanent magnets 107 which are of opposite polarity face these magnetic members 114.

Next, the operation will be described.

When deceleration braking of the eddy current deceleration device 101 is turned on, the magnet ring 108 is rotated by the actuator 111 shown in FIG. 26 so that the magnet ring 108 is put in a phase wherein, as shown in FIG. 24, permanent magnets 107, of the permanent magnets 107 of the magnet ring 108, with faces which are of the same polarity as the aforesaid poles facing radially outwards are sandwiched at equal intervals between adjacent permanent magnets 109 with identical polarity poles facing in the circumferential direction of the magnetic ring 110. That is, the magnet ring 108 is put into the braking position described above.

When this happens, the magnetism that is emitted from the permanent magnets 107, 109 of the magnetic ring 110 and magnet ring 108 is transmitted to the rotor 103 through the raised portions 115 of the magnetic ring 110 under mutual repulsion, thereby constituting magnetic circuits 117, 118 respectively connecting the stator 104 and the rotor 103. Eddy currents are therefore generated in the rotor 103, producing deceleration braking of the rotary shaft 102.

Since the magnetism respectively generated from the permanent magnets 107, 109 of the magnet ring 108 and magnetic ring 110 is then transmitted to the rotor 103, the magnetism density that is transmitted to the rotor 103 is much larger than in the case of a prior art type eddy current deceleration device, so strong braking force is obtained.

In contrast, when deceleration braking is turned off, the magnet ring 108 is rotated as shown in FIG. 25, in which the magnet ring 108 is put into a phase in which permanent magnets, of the permanent magnets 107 of the magnet ring 108, that face opposite polarity poles in the radially outwards direction, are sandwiched at equal intervals between adjacent permanent magnets 109 with identical polarity poles facing in the circumferential direction of the magnetic ring 110. When this is done, the permanent magnets 107 of the magnet ring 108 and the permanent magnets 109 of the magnetic ring 110 are mutually magnetically short-circuited, establishing shielding magnetic circuits 119.

Since permanent magnets 107, 109 which are of substantially the same strength are mutually magnetically short-circuited, there is no magnetic leakage to the rotor 103, so generation of dragging torque can be prevented. Also, in particular, since the covering section 116 of the magnetic ring 110 is amply isolated from the rotor 103, any slight amount of magnetism leaking from the permanent magnets 109 is magnetically short-circuited through the covering section 116 without being transmitted to the rotor 103.

In this way, an eddy current deceleration device 101 is constituted comprising: a rotor 103 that is mounted on a rotary shaft 102; a plurality of permanent magnets 107 that are arranged facing the rotor 103, their magnetic poles being arranged in alternately inverted fashion at a prescribed pitch in the circumferential direction and facing the rotor 103 (directed radially) and a magnet ring 108 having magnetic members 114 that magnetically link magnetic poles, of the magnetic poles of these permanent magnets 107, that face away from the rotor 103 (radially inwards); and a magnetic ring 110 arranged between the magnet ring 108 and rotor 103 and having a plurality of permanent magnets 109 that are arranged at a prescribed pitch in the circumferential direction and with facing poles in the circumferential direction being of same polarity and magnetic members 114 that hold these permanent magnets 109, covering the side thereof nearest the rotor 103; at least one of the magnet ring 108 and magnetic ring 110 being freely rotatable. The braking force can therefore be increased (approximately doubled per unit circumferential length) and generation of dragging torque can be prevented.

It should be noted that, although, in the case of the magnet ring 108, spaces 113 were formed between the permanent magnets 107 thereof, there is no restriction to this, and the permanent magnets 107 could be magnetically separated by providing non-magnetic bodies (not shown) of for example austenitic stainless steel therebetween.

Also, although it was arranged for the magnet ring 108 to be rotated by the actuator 111, it could be arranged for the magnetic ring 110 to be rotated instead of the magnet ring 108, or indeed for both the magnet ring 108 and magnetic ring 110 to be rotated.

Figure 32:
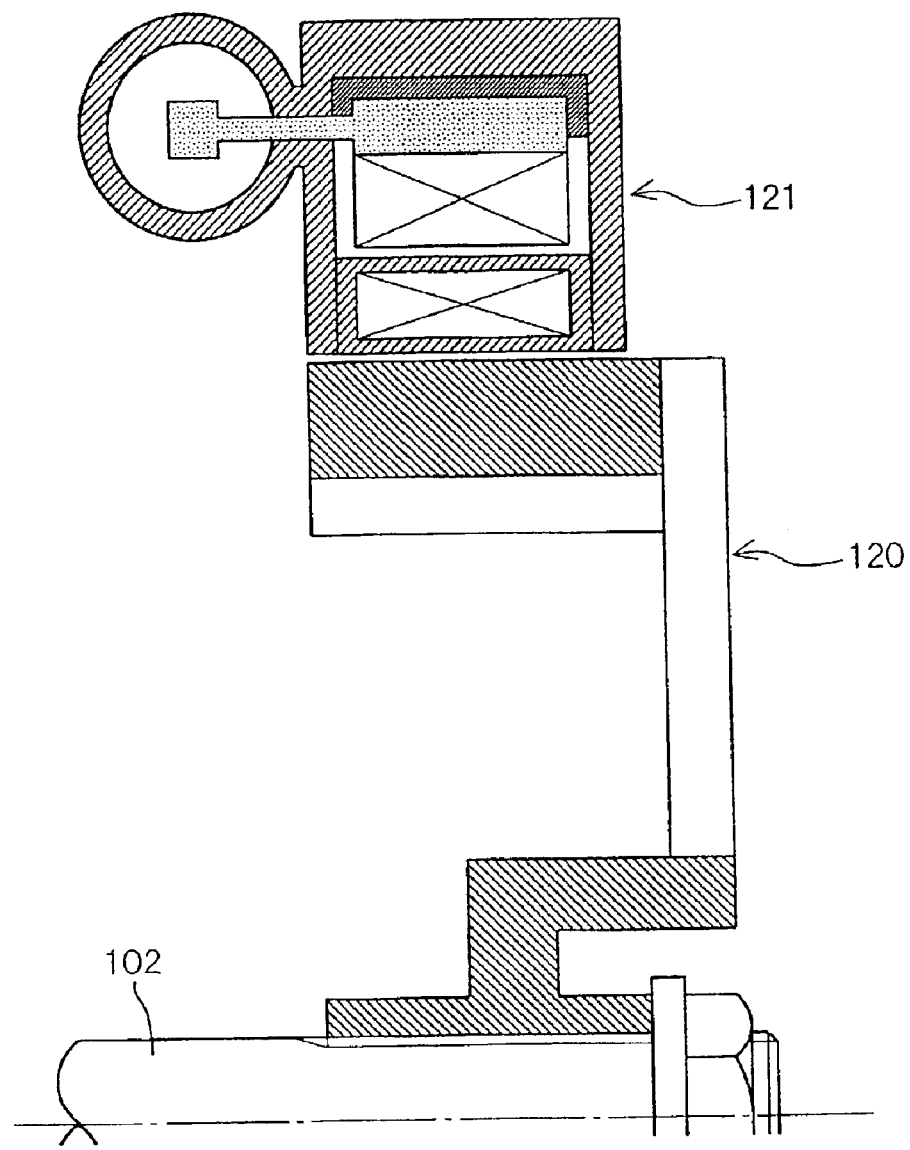
FIG. 32 is a side cross-sectional view showing a modified example of the above eddy current deceleration device.

Furthermore, although the stator 104 was arranged along the inner circumference of the rotor 103, there is no restriction to this and a stator 121 could be placed along the outer circumferential side of a rotor 120 as shown in FIG. 32, so long as it lies along the rotor 103.

Figure 33:
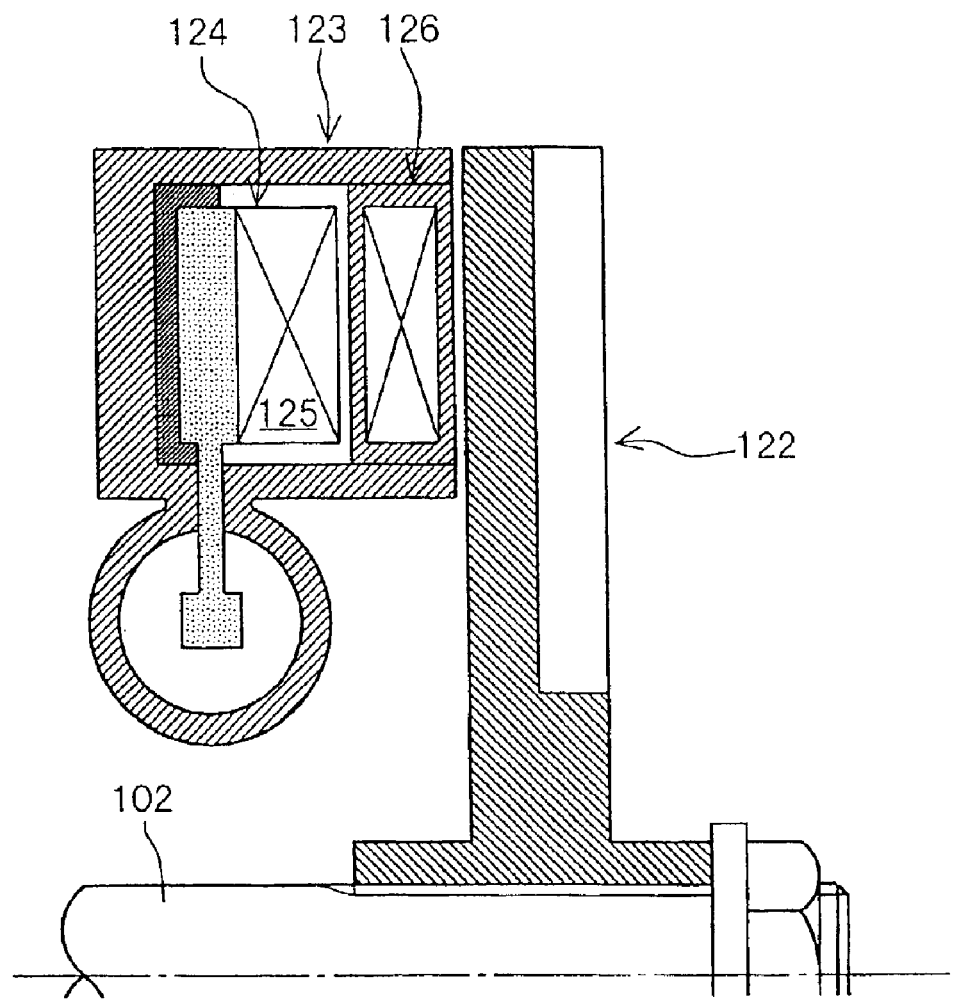
FIG. 33 is a side cross-sectional view showing a modified example of the above eddy current deceleration device.
Figure 34:
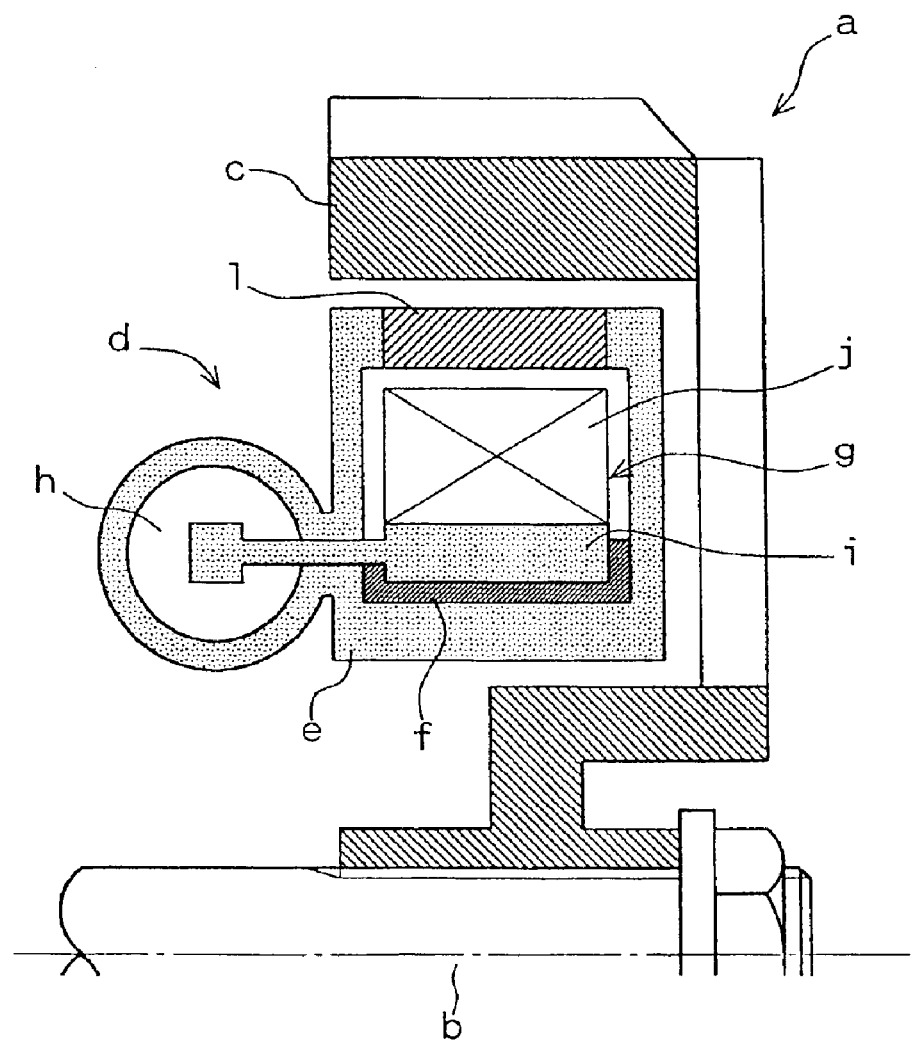
FIG. 34 is a side cross-sectional view of an eddy current deceleration device previously developed by the present inventors.
Figure 35:
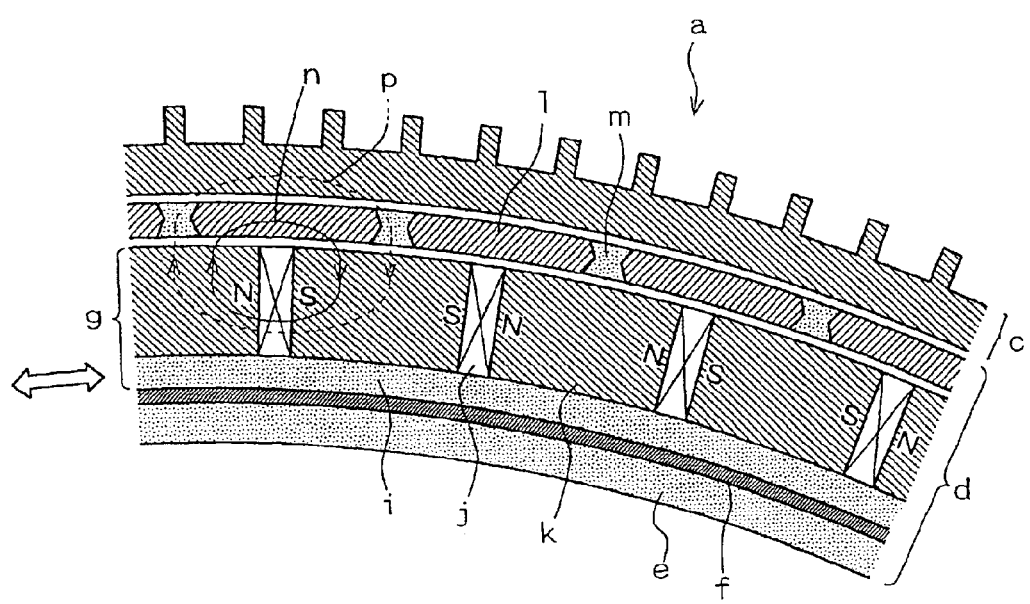
FIG. 35 is a front cross-sectional view of the above device in the brake-OFF condition.
Figure 36:
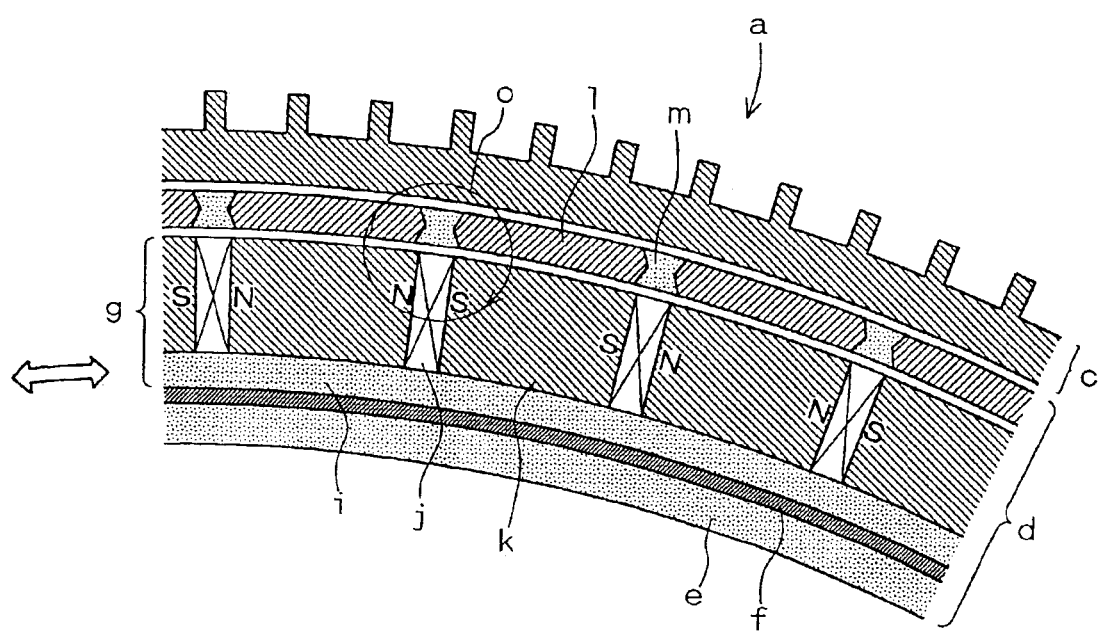
FIG. 36 is a front cross-sectional view of the above device in the brake-ON condition.

Also, as shown in FIG. 33, a stator 123 could be placed along the shaft side of a rotor 122. In this case, a magnetic ring 126 could be arranged between a magnet ring 124 and rotor 122, with permanent magnets 125 of the magnet ring 124 facing the rotor 122, in the same way as in the embodiment described above. The poles of the permanent magnets 125 of the magnet ring 124 could be directed in the axial direction.

Next, a further embodiment will be described of a case in which the magnetic ring 110 cannot be made sufficiently thick in the radial direction. The construction of the magnetic ring 110 and the actuator 111 described above is modified but the rest of the construction is the same apart from some adjustment regarding size, so the same reference symbols are attached and further description thereof is omitted.

Figure 27:
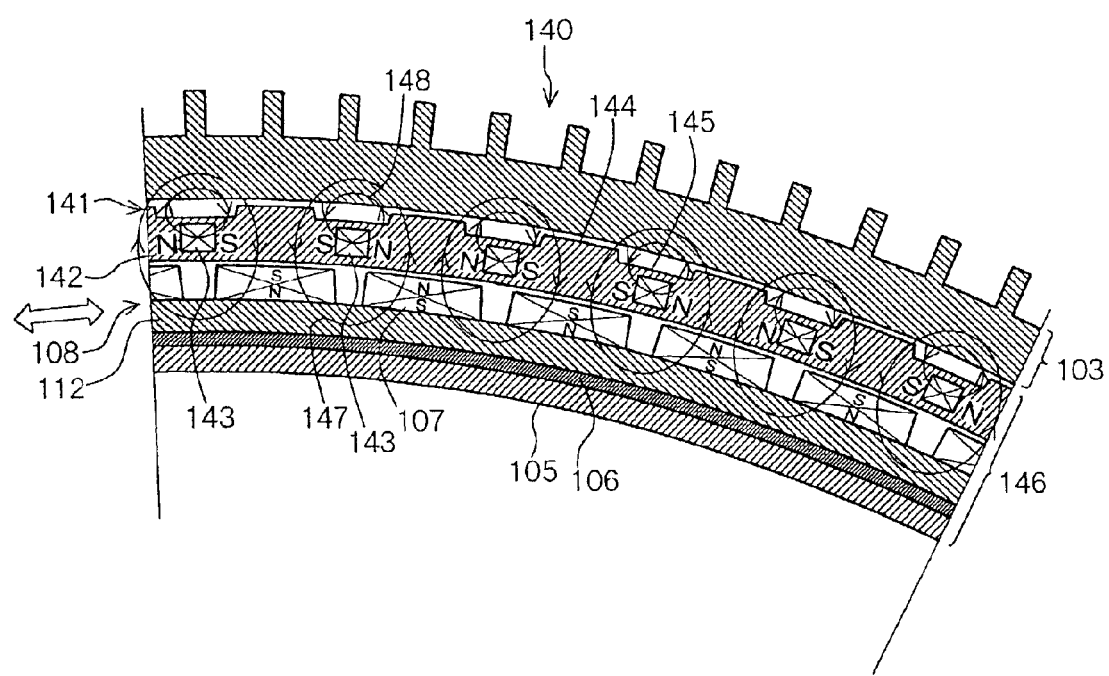
FIG. 27 is a front cross-sectional view of an eddy current deceleration device in the brake-ON condition illustrating another embodiment.

FIG. 27 is a front cross-sectional view seen from the shaft end of the rotary shaft 2 of an eddy current deceleration device 140 according to the present embodiment, in which deceleration braking is achieved by applying magnetism to the rotor 103.

As shown in FIG. 27, a magnetic ring 141 is constituted by embedding with the same arrangement permanent magnets 143 of smaller thickness in the radial direction than the permanent magnets 109 described above, in the interior of magnetic members 142 formed of smaller thickness in the radial direction than the magnetic members 114 described above.

The magnetic members 142 are provided with raised sections 144 projecting towards the rotor 103 in the same way as described above and a covering section 145 is formed of sufficiently small thickness.

Also, since the permanent magnets 143 of the magnetic ring 141 are smaller than those described above, their magnetic force is respectively weaker than that of the permanent magnets 107 of the magnet ring 108.

Figure 28:
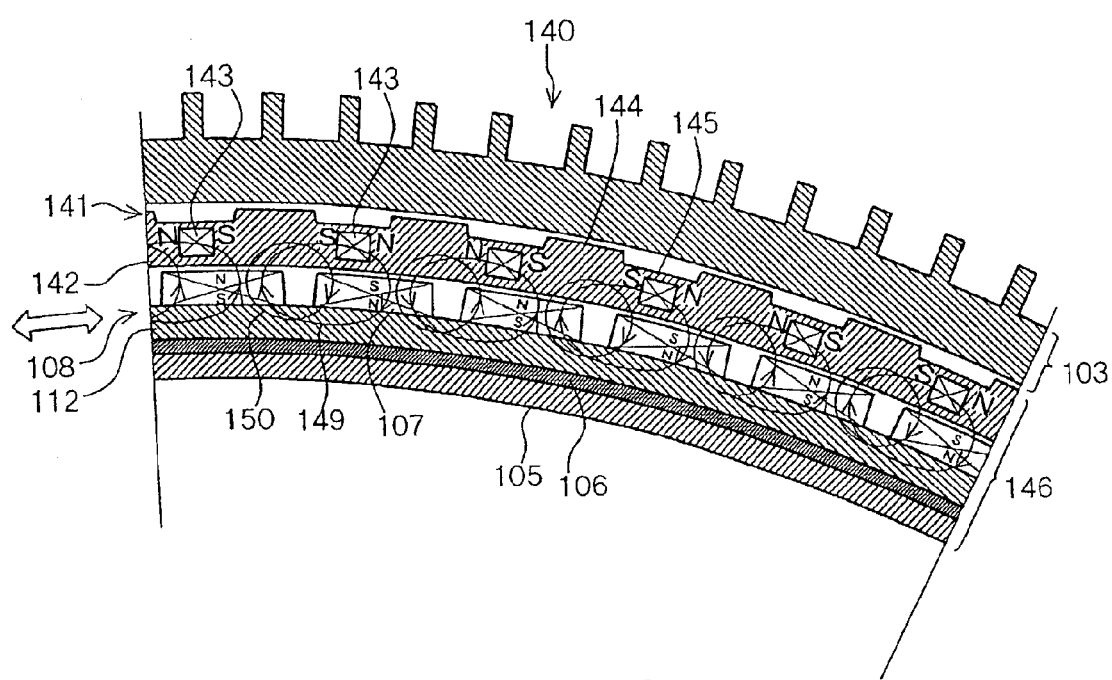
FIG. 28 is a front cross-sectional view of an eddy current deceleration device according to FIG. 27 in the brake-OFF condition.

An actuator (not shown) is formed so as to rotate the magnet ring 108 so as to set the magnet ring 108 in one of a phase (braking position: FIG. 27) in which the permanent magnets 107, of the permanent magnets 107 of the magnet ring 108, have their faces which are of the same polarity as the aforementioned poles and that are directed towards the rotor 103 are sandwiched at equal intervals between the permanent magnets 143 of the magnet ring 141, which are adjacent and whereof identical polarity poles face each other in the circumferential direction, and a phase (non-braking position: FIG. 28) in which the magnet ring 108 is offset with a pitch of substantially ⅔ from this phase in the circumferential direction.

That is, by rotating the aforesaid magnet ring 108, the actuator selects one of a phase (braking position: FIG. 27) in which permanent magnets 107, of the permanent magnets 107 of the magnet ring 108, that are of the same polarity as the permanent magnets 143 sandwiching the aforesaid magnetic members 142, are directed towards the magnetic members 142 between the permanent magnets 143 of the magnetic ring 141 and a phase (non-braking position: FIG. 28) that is offset with a pitch of substantially ⅔ in the circumferential direction from this braking position.

Next, the operation of this embodiment will be described.

When deceleration braking of the eddy current deceleration device 140 is turned on, the magnet ring 108 is rotated by the actuator so that the magnet ring 108 is in a phase such that the permanent magnets 107, of the permanent magnets 107 of the magnet ring 108, whose faces, that are of the same polarity as the aforesaid poles, are directed radially outwards (towards the rotor 103), are sandwiched at equal intervals between the permanent magnets 143 of the magnetic ring 141, which are adjacent and whereof identical polarity poles face each other in the circumferential direction, as shown in FIG. 27. That is, the magnet ring 108 is put into a braking position.

When this happens, the magnetism that is emitted from the permanent magnets 143, 107 of the magnetic ring 141 and the magnet ring 108 is transmitted to the rotor 103 through the raised sections 144 of the magnetic ring 141 while under mutual repulsion, thereby constituting magnetic circuits 147, 148 respectively connecting the stator 146 and rotor 103. Eddy currents are therefore generated in the rotor 103, as a result of which the rotary shaft 102 is subjected to deceleration braking.

Contrariwise, when deceleration braking of the eddy current deceleration device 140 is turned off, the magnet ring 108 is rotated as shown in FIG. 28 so as to put the magnet ring 128 in a phase offset with a pitch of substantially ⅔ in the circumferential direction from the braking position. That is, the magnet ring 108 is put into a non-braking position. When this happens, a first shielding magnetic circuit 149 is constituted between the permanent magnets 107 of the magnet ring 108 and the permanent magnets 143 of the magnetic ring 141 by mutual magnetic short-circuiting of the permanent magnets 107 of the magnet ring 108 and the permanent magnets 143 of the magnetic ring 141 and a second shielding magnetic circuit 150 is constituted between the permanent magnets 107 of the magnet ring 108 and the magnetic members 142 of the magnetic ring 141.

Thanks to the magnetic short-circuiting, achieved by the construction of a second shielding magnetic circuit 150 between the magnetic members 142 of the magnetic ring 141, of any magnetism emitted from the permanent magnets 107 of the magnet ring 108 that is not magnetically short-circuited by the permanent magnets 143 of the magnetic ring 141, none can leak to the rotor 103 and generation of dragging torque can be prevented.

Also, since the permanent magnets 107 of the magnet ring 108 are formed with ample length in the circumferential direction such as to extend in the circumferential direction beyond the position of the permanent magnets 143 of the magnetic ring 141 when the magnet ring 108 is set in the non-braking position, the second shielding magnetic circuit 150 can be constituted in an increased thickness portion (portion where there are no permanent magnets 143) of the magnetic members 142, that is not likely to be magnetically saturated.

Thus, thanks to the provision of an actuator that sets, by rotating the magnet ring 108, one of a phase (braking position) in which permanent magnets 107, of the permanent magnets 107 of the magnet ring 108, whose faces which are of the same polarity as the aforesaid poles are directed towards the rotor 103 are sandwiched at equal intervals between permanent magnets 143 that are adjacent and whose identical polarity poles face each other in the circumferential direction of the magnetic ring 141 and a phase (non-braking position) wherein the magnet ring 108 and magnetic ring 141 are offset by a pitch of substantially ⅔ in the circumferential direction from the foregoing phase, even if the permanent magnets 143 of the magnetic ring 141 are set to have a weaker magnetic force than the permanent magnets 107 of the magnet ring 108, generation of dragging torque can be prevented and braking force can be considerably improved.

It should be noted that although it is preferable from the point of view of ease of magnetic saturation of the vicinity of the permanent magnets 143 of the magnetic ring 141 that the non-braking position should be in a phase offset by a pitch of substantially ⅔ in the circumferential direction from the braking position, there is no restriction to this. So long as this phase (non-braking position) is offset by a prescribed rotational width that exceeds a pitch of ½ in the circumferential direction but is less than 1 pitch from the braking position, a second shielding magnetic circuit 150 can be constituted and generation of dragging torque can be prevented.

Also, although the magnetic ring 141 was constituted by embedding a plurality of permanent magnets 143 in an annular magnetic member 142, there is no restriction to this.

Figure 29:
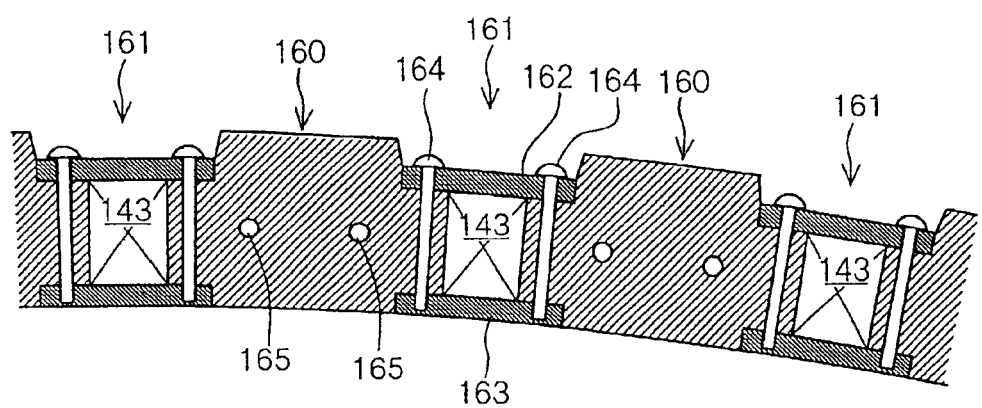
FIG. 29 is a front cross-sectional view showing a modified example of a magnetic ring of an eddy current deceleration device.

For example, as shown in FIG. 29, the magnetic ring 141 could be constituted by providing a plurality of magnetic blocks 160 constituting pole pieces and formed in arcuate shape and connecting elements 161 connecting the ends in the circumferential direction of these magnetic blocks 160 while holding the permanent magnets 143.

Specifically, the magnetic blocks 160 may be constituted by magnetic bodies (for example soft magnetic members such as iron or laminated electromagnetic steel sheet) formed in block shape. The connecting elements 161 may comprise outer circumferential members 162 for structurally connecting the outer circumferential sides of the ends in the circumferential direction of the magnetic blocks 160 and inner circumferential connecting members 163 for structurally connecting the inner circumferential sides of these ends, the permanent magnets 143 being held or fixed by being sandwiched between the inner circumferential connecting members 163 and the outer circumferential connecting members 162.

The external circumferential collecting members 162 and internal circumferential connecting members 163 may be of a shape such as plate shape, net shape or rod shape elongate in the circumferential direction capable of connecting the magnetic blocks 160 with each other and of fixing the permanent magnets 143 and may be mounted on the magnetic blocks 160 using fixing metal elements 162 such as bolts or screws.

The outer circumferential connecting members 162 and inner circumferential connecting members 163 are preferably formed of non-magnetic material such as aluminum or stainless steel but could be formed of magnetic material (for example soft magnetic material such as electromagnetic steel sheet).

The end faces of the magnetic blocks 160 facing the axial direction (longitudinal direction) may be suitably formed with bolt holes 165 for fixing in the casing 105 of the stator 104.

Figure 30:
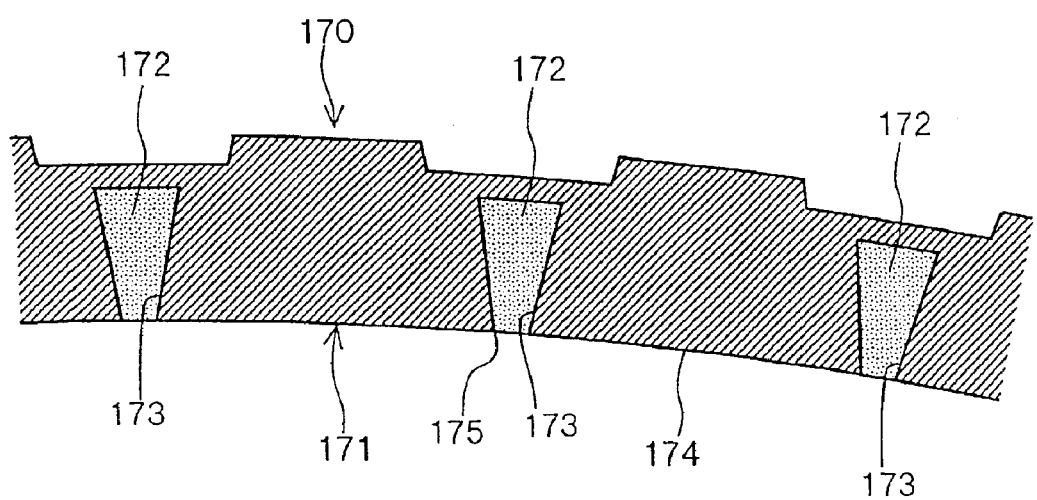
FIG. 30 is a front cross-sectional view showing a modified example of a magnetic ring of an eddy current deceleration device.

Also, as shown in FIG. 30, the magnetic members 171 of the magnetic ring 170 may be formed in annular shape and may be provided with embedding holes 173 for fixing permanent magnets 172 by embedding the permanent magnets 172 therein. In this case, the embedding holes 173 may be formed on the radially inwards side of the magnetic members 171 or may be formed, from apertures 175 formed in the inner circumferential face 174 of the magnetic member 171, with width increasing in tapered fashion in the inwards direction (radially outwards direction). The permanent magnets 172 can thus easily be prevented from falling out from the magnetic member 171.

Figure 31:
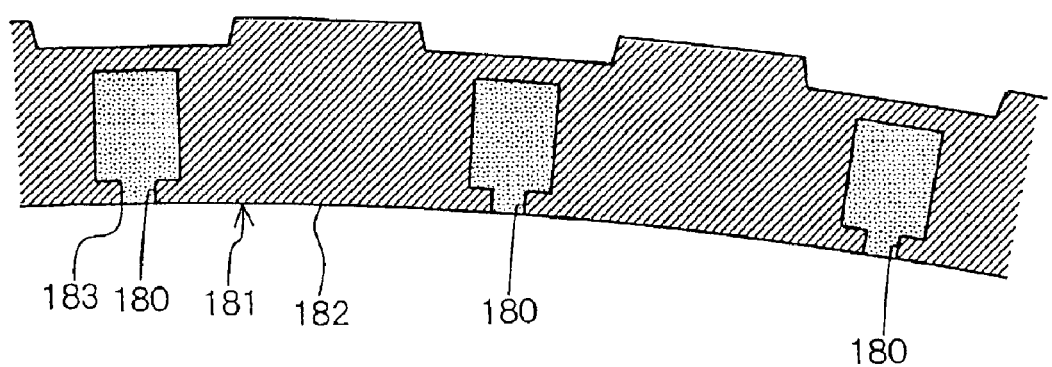
FIG. 31 is a front cross-sectional view showing a modified example of a magnetic ring of an eddy current deceleration device.

Also, in addition, as shown in FIG. 31, the embedding holes 180 may be formed with increasing width in stepwise fashion from apertures 183 formed in the inner circumferential surface 182 of the magnetic members 181 in the inwards direction (radially outwards direction), the essential feature being that the width of these embedding holes is reduced at their apertures.

What is claimed is:

1. An eddy current deceleration device comprising:
    a rotor mounted on a rotary shaft;
    a magnet ring arranged facing said rotor and including a first plurality of permanent magnets that are arranged at a prescribed pitch in the a circumferential direction, each permanent magnet having poles of opposite polarity and being oriented such that one of said poles face said rotor and such that the respective polarities of said poles facing said rotor are alternately inverted, and a first magnetic member for connecting said poles of said first plurality of permanent magnets that face away from said rotor; and
    a magnetic ring arranged between magnet ring and the rotor and including a second plurality of permanent magnets that are arranged at a prescribed pitch in the circumferential direction such that adjacent permanent magnets have poles facing in the circumferential direction which are of a same polarity, and a second magnetic member that holds said second plurality of permanent magnets;
    at least one of the magnet ring and magnetic ring being freely rotatable, and
    said second magnetic member having an annular shape and being provided with embedding holes so that said second plurality of permanent magnets are embedded and fixed in said holes.

2. The eddy current deceleration device according to claim 1 comprising an actuator that rotates at least one of said magnet ring and magnetic ring and that sets the relative position of the magnet ring and magnetic ring in one of a braking position, in which the first plurality of permanent magnets are pitchwise positioned between facing poles of adjacent permanent magnets of the second plurality of permanent magnets such that the polarity of the pole facing the rotor of each permanent magnet of the first plurality of permanent magnets is the same as the polarity of the facing poles of the adjacent permanent magnets of the second plurality of permanent magnets, and a non-braking position in which the magnet ring and the magnetic ring are offset by a prescribed rotational width exceeding ½ pitch but less than 1 pitch in the circumferential direction from said braking position.

3. The eddy current deceleration device according to claim 2 wherein said non-braking position is set in a position offset by substantially ½ pitch in the circumferential direction from said braking position.

4. The eddy current deceleration device according to claim 1 wherein said rotor comprises a drum body fixed to the rotary shaft.

5. The eddy current deceleration device according to claim 1 wherein said rotor comprises a disk body fixed to the rotary shaft.

* * * * *